(12) United States Patent
McCoy et al.

(10) Patent No.: US 10,243,715 B2
(45) Date of Patent: Mar. 26, 2019

(54) UNIFIED FLEXIBLE RADIO ACCESS TECHNOLOGY (RAT) FOR 5G MOBILE COMMUNICATION SYSTEMS

(71) Applicant: National Instruments Corporation, Austin, TX (US)

(72) Inventors: James Wesley McCoy, Leander, TX (US); Nikhil U. Kundargi, Austin, TX (US); Karl F. Nieman, Austin, TX (US)

(73) Assignee: National Instruments Corporation, Austin, TX (US)

( * ) Notice: Subject to any disclaimer, the term of this patent is extended or adjusted under 35 U.S.C. 154(b) by 81 days.

(21) Appl. No.: 15/270,181

(22) Filed: Sep. 20, 2016

(65) Prior Publication Data

US 2017/0290013 A1    Oct. 5, 2017

Related U.S. Application Data

(60) Provisional application No. 62/317,134, filed on Apr. 1, 2016, provisional application No. 62/317,371, filed on Apr. 1, 2016.

(51) Int. Cl.
*H04L 5/00* (2006.01)
*H04W 72/12* (2009.01)

(52) U.S. Cl.
CPC ............ *H04L 5/0055* (2013.01); *H04L 5/005* (2013.01); *H04W 72/1289* (2013.01)

(58) Field of Classification Search
CPC ..... H04L 5/0055; H04L 5/0023; H04L 5/005; H04L 1/1861; H04L 27/2602; H04L 5/0064; H04L 5/0007; H04L 27/2656; H04W 72/0446; H04W 72/0406; H04W 72/0453; H04W 72/1278; H04W 74/04; H04W 72/1289; H04W 72/04
See application file for complete search history.

(56) References Cited

U.S. PATENT DOCUMENTS

| | | | |
|---|---|---|---|
| 8,325,755 B2 | 12/2012 | Lee et al. | |
| 9,191,161 B2 | 11/2015 | Li et al. | |
| 2006/0094435 A1* | 5/2006 | Thomas | H04B 7/0669 455/450 |
| 2009/0122771 A1* | 5/2009 | Cai | H04J 11/00 370/338 |
| 2010/0016023 A1* | 1/2010 | Yamauchi | H04L 5/0037 455/562.1 |

(Continued)

OTHER PUBLICATIONS

Luther, "*5G Massive MIMO Testbed: From Theory to Reality*", National Instruments, Jun. 8, 2016, pp. 1-11.

(Continued)

*Primary Examiner* — Kwang B Yao
*Assistant Examiner* — Ricardo H Castaneyra
(74) *Attorney, Agent, or Firm* — E. Alan Davis; James W. Huffman

(57) ABSTRACT

Embodiments are disclosed for a new unified and flexible frame structure for 5G (5th generation) mobile telecommunications standard and related radio access technology (RAT). The disclosed embodiments use communication frames with multiple partition types and are able to span a wide range of 5G deployment scenarios in a flexible and scalable manner.

30 Claims, 17 Drawing Sheets

UNIFIED FLEXIBLE FRAME WITH MIXTURE OF PARTITION TYPE I AND II

(56) References Cited

U.S. PATENT DOCUMENTS

| | | | |
|---|---|---|---|
| 2011/0194539 A1* | 8/2011 | Blasinski | H04W 72/1252 370/336 |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2016/0165622 A1* | 6/2016 | Luo | H04W 72/1226 370/329 |

OTHER PUBLICATIONS

"Introduction to the NI mmWave Transceiver System Hardware", National Instruments, Apr. 20, 2016, pp. 1-8.

"National Instruments Wireless Research Handbook", National Instruments, May 2016, pp. 1-37.

Shepard et al. "Argos: Practical Many-Antenna Base Stations" MobiCom 12, Aug. 22-26, 2012, Istanbul, Turkey, pp. 53-64.

Khoolenjani, et al. "Distribution of the Ratio of Normal and Rice Random Variables" Digital Commons @WayneState, Journal of Modern Applied Statistical Methods, vol. 12, Issue 2, Article 27, Nov. 1, 2013, pp. 1-15.

Shen et al. "Channel Estimation in OFDM Systems", Freescale Semiconductor, Inc. Application Note, Jan. 2006, pp. 1-16.

Vieira et al., "Reciprocity calibration methods for Massive MIMO based on antenna coupling", Department of Electrical Engineering, Lund University, 5 pp. (Jan. 1, 2014).

Harris, "University of Bristol and Lund University Partner with NI to Set World Records in 5G Wireless Spectral Efficiency Using Massive MIMO", 7 pp. (May 2016).

"LTE in a Nutshell—Physical Layer", Telesystem Innovations Inc. White Paper, 18 pp. (2010).

"An Introduction to Orthogonal Frequency Division Multiplex Technology", Keithley Instruments, Inc., 66 pp. (2008).

Huawei et al., "WF on CSI Acquisition in NR", 3GPP TSG RAB WG1 Meeting #85, 4 pp. (May 27, 2016).

Huawei et al., "WF on CSI Acquisition Framework in NR", 3GPP TSG RAN WG1 Meeting #85, 3 pp. (May 27, 2016).

"Study on latency reduction techniques for LTE", 3GPP TR 36.881 Technical Report, 92 pp. (Feb. 2016).

"Study on Scenarios and Requirements for Next Generation Access Technologies", 3GPP TR 38.913 Technical Report, 19 pp. (Feb. 2016).

Vieira et al., "A Flexible 100-antenna testbed for Massive MIMO", Department of Electrical and Information Technology at Lund University, 7 pp. (Jan. 1, 2014).

"Bristol and Lund set a new world record in 5G wireless spectrum efficiency", University of Bristol News, 6 pp. (Mar. 23, 2016).

"Study on NR New Radio Access Technology", 3GPP TSG RAN Meeting #71, 8 pp. (Mar. 2016).

Working Group Communication Architectures and Technologies, LTE Small Cell Enhancement by Dual Connectivity, Wireless World Research Forum, 22 pp. (Nov 2014).

"LTE in a Nutshell: Protocol Architecture" Telesystem Innovations Inc. White Paper, 12 pp. (2010).

"LTE Random Access Procedure", EventHelix.com Inc., 5 pp (2015).

* cited by examiner

UNIFIED FLEXIBLE RADIO ACCESS TECHNOLOGY (RAT) FOR 5G MOBILE COMMUNICATION SYSTEMS

RELATED APPLICATIONS

This application claims priority to the following provisional applications: U.S. Provisional Patent Application Ser. No. 62/317,134, filed Apr. 1, 2016, and entitled "UNIFIED FLEXIBLE RADIO ACCESS TECHNOLOGY (RAT) FOR 5G MOBILE COMMUNICATION SYSTEMS," and U.S. Provisional Patent Application Ser. No. 62/317,371, filed Apr. 1, 2016, and entitled "UNIFIED FLEXIBLE RADIO ACCESS TECHNOLOGY (RAT) FOR 5G MOBILE COMMUNICATION SYSTEMS," each of which is hereby incorporated by reference in its entirety.

TECHNICAL FIELD

The disclosed embodiments relate to mobile telecommunications.

BACKGROUND

The new radio definition in 3GPP ($3^{rd}$ Generation Partnership Project) for mobile systems will encompass a variety of deployment scenarios such as Rural, Urban Macro, Dense Urban, Indoor, etc. with a gamut of requirements. For example, Rural will require up to 5 kilometers (km) ISD (international subscriber dialing) and high channel delay spread while Urban Macro has a 200 meter (m) ISD with pedestrian or stationary users.

SUMMARY

As described herein, a new unified and flexible frame structure is disclosed for 5G ($5^{th}$ generation) mobile telecommunications standard and related radio access technology (RAT). The disclosed embodiments use communication frames with multiple partition types and are able to span a wide variety of 5G deployment scenarios in a flexible and scalable manner.

The disclosed embodiments include one or more of the following features:
A plurality of partition types with each partition type having its own numerology.
The numerology of each partition type includes its unique set of parameters including one or more of the following parameters:
  slot size,
  number of symbols per slot,
  number of subcarriers,
  number of occupied subcarriers,
  CP (cyclic prefix) length,
  Pilot spacing,
  Modulation (OFDM (orthogonal frequency division multiplexing), SC (suppressed carrier)),
  UL/DL (uplink/downlink) periodicity, and/or
  Other parameters.
A method for coexistence and combination of these partition types by aligning the numerologies at the type transition boundaries in time and including the following feature:
  All partition types will have a common baseline sampling rate, and/or
  Other features.
A multi resolution frame schedule which includes these partition types and includes one or more of the following features:
  The time frequency grid is composed of a plurality of such partitions,
  In time domain, the partitions are structured so that an integer number of slots of the shortest one fits in one slot of the longest partition, and/or
  Other features.
A method for static, semi static or dynamic changing of this multi resolution frame schedule;
A control channel to support the configuration of the unified flexible RAT (radio access technology), and/or
Other features.

For one embodiment, an apparatus is disclosed including one or more antennas, one or more radios coupled to the one or more antennas, and one or more processors coupled to the one or more radios and programmed to receive communication frames including OFDM (orthogonal frequency division multiplex) symbols from a plurality of wireless devices through the one or more radios and the one or more antennas and to transmit communication frames including OFDM symbols to the plurality of wireless devices through the one or more radios and the one or more antennas. Each communication frame includes a plurality of partition types having a common baseline sampling rate. The plurality of partition types include partition parameters including one or more of the following: size of the time slots, number of symbols per time slot, number of subcarriers, number of occupied subcarriers, cyclic prefix length, pilot spacing, and uplink and downlink periodicity. And each partition type has a unique set of configuration parameters.

In additional embodiments, the one or more processors are further configured to communicate control messages with the plurality of wireless devices through the one or more radios and the one or more antennas, and the control messages include configuration parameters for the plurality of partition types. In further embodiments, the control messages are communicated through a control channel. In further embodiments, the control messages include frame scheduling messages to determine time slots for communications with the plurality of wireless devices. In still further embodiments, the frame scheduling messages include reconfiguration messages to reconfigure time slots for communications with the plurality of wireless devices.

In additional embodiments, each partition type includes a plurality of time slots, and each time slot includes a plurality of OFDM symbols. In further embodiments, each OFDM symbol has a symbol type, and the symbol type includes at least one of an uplink pilot, a downlink pilot, uplink data, downlink data, sync, or guard. In further embodiments, the time slots for each partition type have a predetermined time length, and the predetermined time lengths are different for different partition types. In still further embodiments, the partition type having the shortest predetermined time length for its time slots represents the shortest partition type; the partition type having the longest predetermined time length for its time slots represents the longest partition type; and an integer number of time slots for the shortest partition type fits within one time slot for the longest partition type. In other embodiments, the plurality of partition types include two or more partition types including a first partition type having times slot with a predetermined time length of 0.1 milliseconds and a second partition type having times slot with a predetermined time length of 0.5 milliseconds. In other embodiments, the longest time slot for the plurality of partition types is 0.5 milliseconds.

In additional embodiments, the plurality of partition types include two or more partition types including a first partition type and a second partition type; the first partition type is shorter in time than the second partition type; and different types of communications use different partition types. In further embodiments, transmit and acknowledge messages communicated with the plurality of wireless devices are configured to use the first partition type. In further embodiments, sounding pilot communications with the plurality of wireless devices are configured to use the first partition type, and data communications with the plurality of wireless devices are configured to use the second partition type. In further embodiments, the plurality of wireless devices include one or more first wireless devices having a first cyclic prefix (CP) length and one or more second wireless devices having a second cyclic prefix (CP) length with the first CP length being shorter than the second CP length; the communications with the one or more first wireless devices are configured to use the first partition type; and the communications with the one or more second wireless devices are configured to use the second partition type.

For one embodiment, a method for wireless communications is disclosed including receiving communication frames including OFDM (orthogonal frequency division multiplex) symbols from a plurality of wireless devices through one or more radios coupled to one or more antennas and transmitting communication frames including OFDM symbols to the plurality of wireless devices through the one or more radios and the one or more antennas. Each communication frame includes a plurality of partition types having a common baseline sampling rate. The plurality of partition types include partition parameters including one or more of the following: size of the time slots, number of symbols per time slot, number of subcarriers, number of occupied subcarriers, cyclic prefix length, pilot spacing, and uplink and downlink periodicity. And each partition type has a unique set of configuration parameters.

In further embodiments, the method also includes communicating control messages with the plurality of wireless devices through the one or more radios and the one or more antennas, and the control messages include configuration parameters for the plurality of partition types. In further embodiments, the method further includes communicating the control messages through a control channel. In further embodiments, the control messages include frame scheduling messages to determine time slots for communications with the plurality of wireless devices. In still further embodiments, the frame scheduling messages include reconfiguration messages to reconfigure time slots for communications with the plurality of wireless devices.

In further embodiments, each partition type includes a plurality of time slots, and each time slot includes a plurality of OFDM symbols. In further embodiments, each OFDM symbol has a symbol type, and the symbol type includes at least one of an uplink pilot, a downlink pilot, uplink data, downlink data, sync, or guard. In further embodiments, the time slots for each partition type have a predetermined time length, and the predetermined time lengths are different for different partition types. In still further embodiments, the partition type having the shortest predetermined time length for its time slots represents the shortest partition type; the partition type having the longest predetermined time length for its time slots represents the longest partition type; and an integer number of time slots for the shortest partition type fits within one time slot for the longest partition type. In other embodiments, the plurality of partition types includes two or more partition types including a first partition type having times slot with a predetermined time length of 0.1 milliseconds and a second partition type having times slot with a predetermined time length of 0.5 milliseconds. In other embodiments, the longest time slot for the plurality of partition types is 0.5 milliseconds.

In additional embodiments, the plurality of partition types include two or more partition types including a first partition type and a second partition type; the first partition type is shorter in time than the second partition type; and different types of communications use different partition types. In further embodiments, the method also includes communicating transmit and acknowledge messages using the first partition type. In further embodiments, the method also includes communicating sounding pilots using the first partition type and communicating data using the second partition type. In further embodiments, the plurality of wireless devices include one or more first wireless devices having a first cyclic prefix (CP) length and one or more second wireless devices having a second cyclic prefix (CP) length with the first CP length being shorter than the second CP length, and the method further includes using the first partition type to communicate with the one or more first wireless devices and using the second partition type to communicate with the one or more second wireless devices.

Other variations can also be implemented while still taking advantage of the dynamic and flexible frame structure embodiments and related components described herein.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

DETAILED DESCRIPTION

Figure 1:
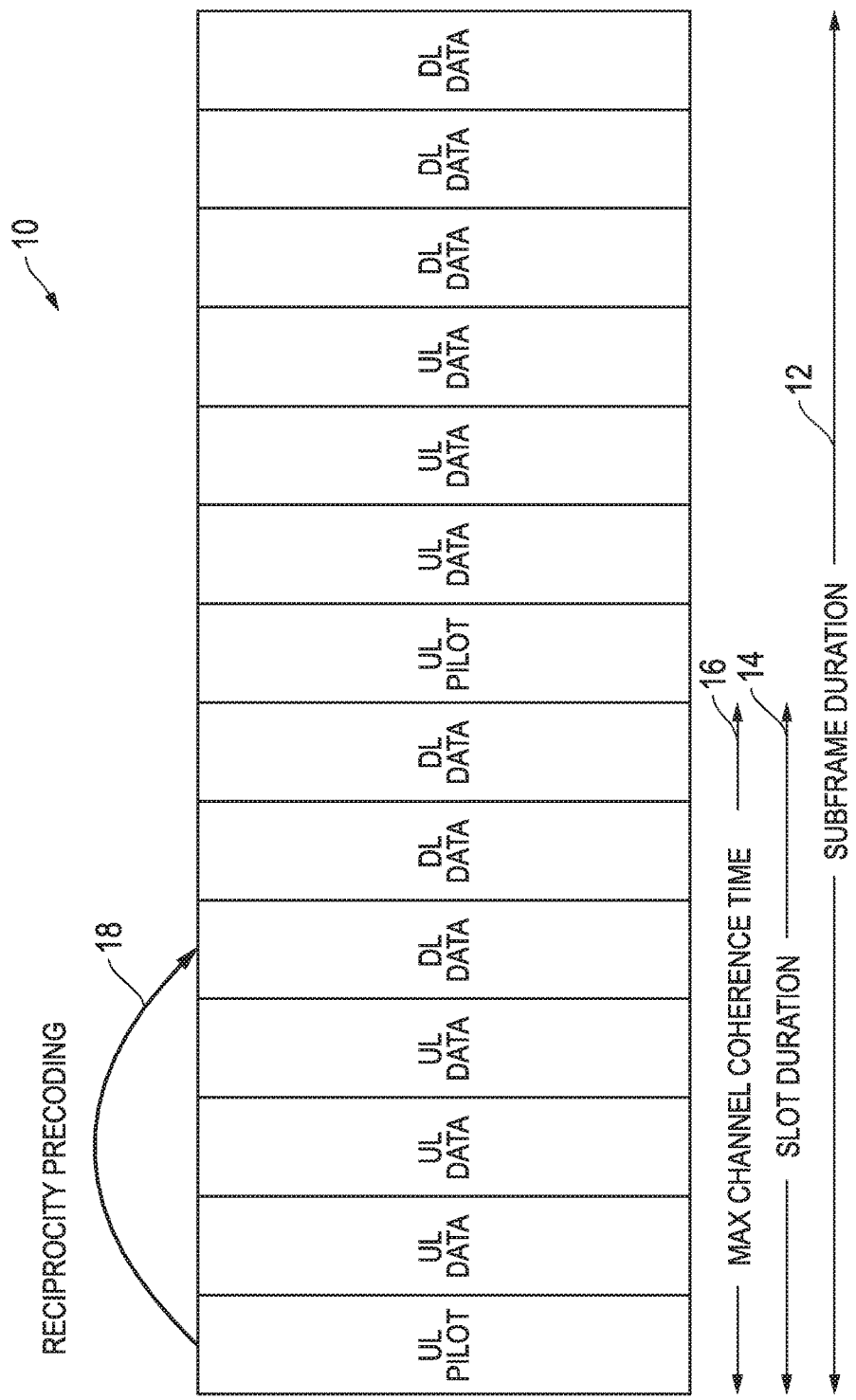
FIG. 1 is a diagram of an example embodiment for the frame structure of two consecutive slots of a partition.

A new unified and flexible frame structure for 5G ($5^{th}$ generation) mobile telecommunications standard and related radio access technology (RAT) is disclosed that is able to span a wide variety of deployment scenarios (e.g., Rural, Urban Macro, Dense Urban, Indoor, etc.) in a flexible and scalable manner.

Massive MIMO (multiple input, multiple output) communication systems can be used for 5G dynamic TDD (time division duplex) air interfaces. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC). Example embodiments for massive MIMO communication systems and related signaling and frame structures are described within U.S. Published Patent Application 2015/0326291, entitled "SIGNALING AND FRAME STRUCTURE FOR MASSIVE MIMO CELLULAR TELECOMMUNICATION SYSTEMS," which is hereby incorporated by reference in its entirety.

The disclosed unified and flexible frame structure described herein with respect to FIGS. 1-10 can be used as a new dynamic and flexible signaling and frame structure for dynamic TDD air interfaces, such as for example the massive MIMO cellular telecommunication systems described in U.S. Published Patent Application 2015/0326291. FIGS. 11-18 described below provide example embodiments also described within U.S. Published Patent Application 2015/0326291. Example system objectives, components, and features are now described in more detail. It is further noted that different and/or additional features can also be implemented as desired and related systems and methods can be utilized as well.

Dynamic TDD Radio Interface Description

A new proposed frame structure for the New Radio (NR) includes one or more of the following features: (1) faster TDD switching, (2) symbol level reconfigurable dynamic TDD, and (3) higher UL sounding pilot periodicity contained within a flexible numerology, as well as other advantageous features.

Faster TDD Switching—

Typical channel coherence time for Rural and Urban macro deployment scenarios with high mobility UEs (user equipment) can be on the order of 500-1000 microseconds (μs). The legacy TDD LTE (long term evolution) systems can switch at either 5 milliseconds (ms) or 10 ms. Channel reciprocity based systems use UL (uplink) channel estimates as proxy for downlink CSI (channel state information) and this is accurate only within the channel coherence time. The legacy 5 ms switching periodicity is not fast enough to enable channel reciprocity based operation. The new frame structure disclosed herein advantageously supports UL-DL switching periodicity faster than the channel coherence times.

Symbol Level Reconfigurable Dynamic TDD—

With legacy Dynamic TDD in LTE, the frame type can be reconfigured from mostly DL (downlink) to mostly UL depending on traffic in cell. For low latency applications and high flexibility, the new frame structure disclosed herein advantageously extends this Dynamic TDD to support the designation of UL and DL on a per symbol basis.

Higher UL Sounding Pilot Periodicity—

The frame structure disclosed herein is scalable to Massive MIMO communication systems. It supports channel reciprocity based beamforming for Massive MIMO if UL sounding signals are sent at least once within the worst case channel coherence time. In addition, for the new frame structure disclosed herein, one UL pilot symbol can be sent every 0.5 ms. This UL pilot symbol implementation for the new frame structure advantageously enables support of high mobility scenarios.

FIGS. 1-10 provide example embodiments for a new dynamic and flexible frame structure that provides one or more of these features: (1) faster TDD switching, (2) symbol level reconfigurable dynamic TDD, and (3) higher UL sounding pilot periodicity, as well as other advantageous features.

The UL/DL switching time is configurable and, in certain embodiments, the fastest supported switching periodicity is once every symbol. Every symbol can be defined as either UL Pilot, DL Pilot, UL Data, DL Data, Sync or Guard, and signalling support is provided to redefine the symbol type. The UE-specific UL Pilots are transmitted with a periodicity of once every 0.5 ms to support channel reciprocity and high mobility of UEs. DL pilots can be embedded in DL data or in a dedicated DL Pilot symbol. One guard symbol can also be included in every frame for timing adjustment.

The new radio interface described herein is configured to have a higher bandwidth per component carrier (CC). For certain embodiments, a bandwidth of 100 MHz can be used as the basic unit per CC. Two example embodiments are provided below that partition the time and frequency domain resources of the channel both loosely based on the LTE Advanced numerology.

In particular, the following are two example embodiments that partition channels for the dynamic frame structure embodiments described herein:

Partition I: 75 kHz subcarrier spacing (5× legacy Δf, $\frac{1}{5}^{th}$ of legacy symbol duration)

Partition II: 15 kHz subcarrier spacing, legacy symbol duration

For each, we choose a FFT (Fast Fourier Transform) size to satisfy the following constraints: (1) FFT size is a power of 2, and (2) Target occupied bandwidth of 90%.

TABLE 1 below provides example numerology including field types and parameters for Partition I and Partition II.

TABLE 1

EXAMPLE FIELD TYPES AND PARAMETERS FOR PARTITIONS FOR DYNAMIC FRAME STRUCTURE

| Field type | Description of Parameter | Partition I | Partition II |
|---|---|---|---|
| $f_{SC}$ | Sub-carrier spacing | 75 kHz | 15 kHz |
| $T_{Sym}$ | Symbol duration | 13.3 μs | 66.66 μs |
| $F_s$ | Sampling rate | 153.6 MS/s | 153.6 MS/s |
| $N_{FFT}$ | FFT length | 2048 | 10240 (2048 * 5) |

TABLE 1-continued

EXAMPLE FIELD TYPES AND PARAMETERS FOR
PARTITIONS FOR DYNAMIC FRAME STRUCTURE

| Field type | Description of Parameter | Partition I | Partition II |
|---|---|---|---|
| $N_{CP}$ | Cyclic prefix length | Short: 160 for symbol 0 and 144 for symbol 1-6 Long: 512 | 800 for symbol 0 and 720 for symbol 1-6 |
| $N_{OccupiedSC}$ | Number of occupied sub-carriers | 1200 | 6000 |
| $T_{slot}$ | Slot duration | 0.1 ms | 0.5 ms |

It is noted that in Partition I, the sampling rate is increased by 5× but the legacy number of subcarriers per symbol is maintained. The symbol duration is scaled down by 5× to 13.3 microseconds. In Partition II, the legacy subcarrier spacing is maintained but the number of subcarriers is increased by 5×. Hence, the sampling frequency is also scaled up 5× to oversample the 100 MHz bandwidth by an oversampling factor of 1.53.

FIGS. 1-10 will now be described in more detail.

FIG. 1 is a diagram of an example embodiment 10 for the frame structure of two consecutive slots of a partition. A subframe includes two consecutive slots as indicated by subframe duration 12 and slot duration 14 and associated maximum (max) coherence time 16. Each slot has an Uplink (UL) Pilot symbol as its first symbol (and FIG. 2 below provides details for the structure of this UL Pilot symbol). Following the UL pilot, the $2^{nd}$, $3^{rd}$, and $4^{th}$ symbols are UL Data symbols, and the $5^{th}$, $6^{th}$, and $7^{th}$ symbols are Downlink (DL) Data symbols. For the Massive MIMO deployment where a UL channel estimate is derived from the UL Pilot, the $1^{st}$ symbol for each slot is used to compute the precoded DL data symbols starting from the $5^{th}$ symbol as indicated by arrow 18.

Figure 2:
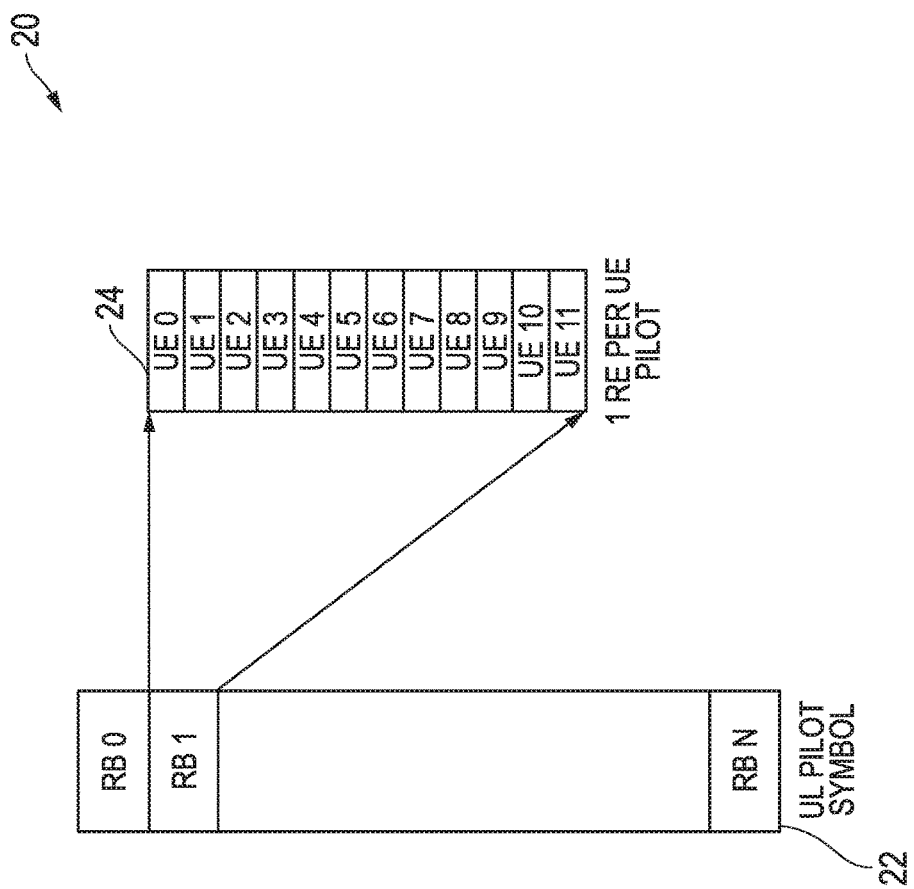
FIG. 2 is a diagram of an example embodiment for a structure for a UL Pilot symbol for the two slots shown in FIG. 1.

FIG. 2 is a diagram of an example embodiment 20 for a structure for the UL Pilot symbols for the two slots shown in FIG. 1. The UL Pilot symbol 22 includes N RBs (Resource Blocks) where each RB includes 12 subcarriers 24. As an example, for a 100 MHz bandwidth with 2048 subcarriers and 1200 Occupied subcarriers, there are N=1200/12=100 RBs. Within each RB, every UE gets a dedicated subcarrier to transmit its pilot symbol, and there is one RE (Resource Element) per UE pilot. All UEs transmit orthogonal pilots as they are separated in frequency. This particular structure supports 12 UEs. It is noted, however, that different numbers of UEs could also be supported, as desired. For example, where 24 UEs are supported, each UE can be allocated a reserved subcarrier in every alternate RB. Other variations could also be implemented.

Figure 3:
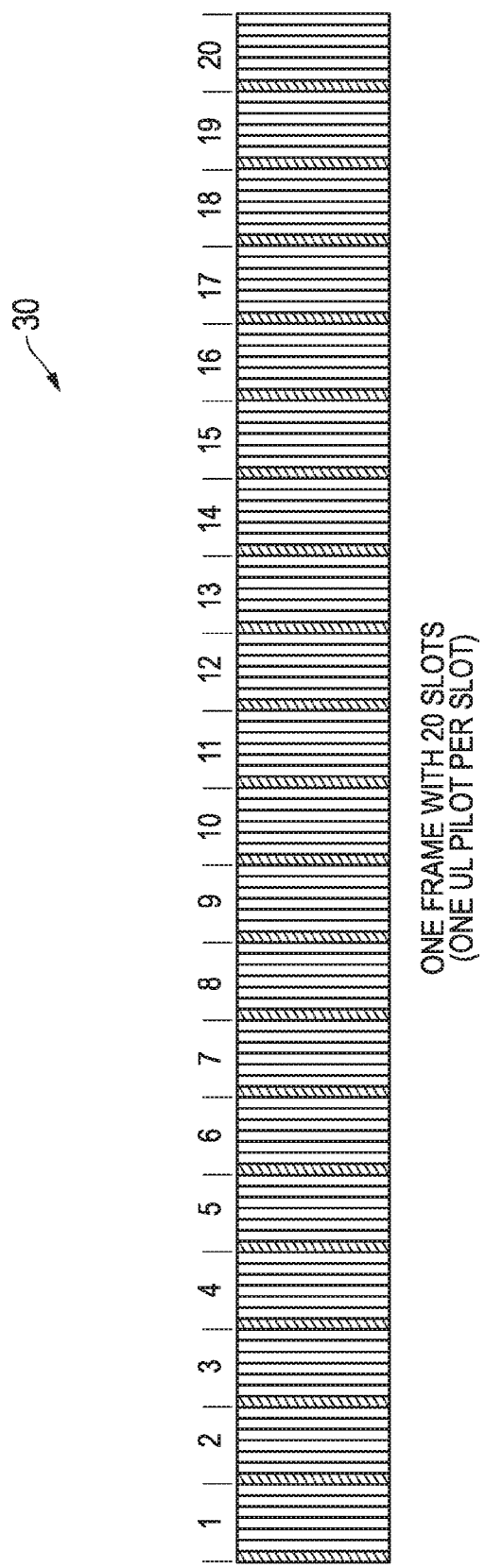
FIG. 3 is a diagram of an example embodiment for a frame structure for a single partition type.

FIG. 3 is a diagram of an example embodiment 30 for a frame structure for a single partition type where the frame includes 20 slots, each slot including 7 symbols. As compared to prior solutions, this frame structure has increased frequency of transmission of UL pilots, for example, once every 7 symbols which is once for each slot. This increased periodicity of UL pilots enables operation based on channel reciprocity as this precoding happens within the channel coherence time.

Figure 4:
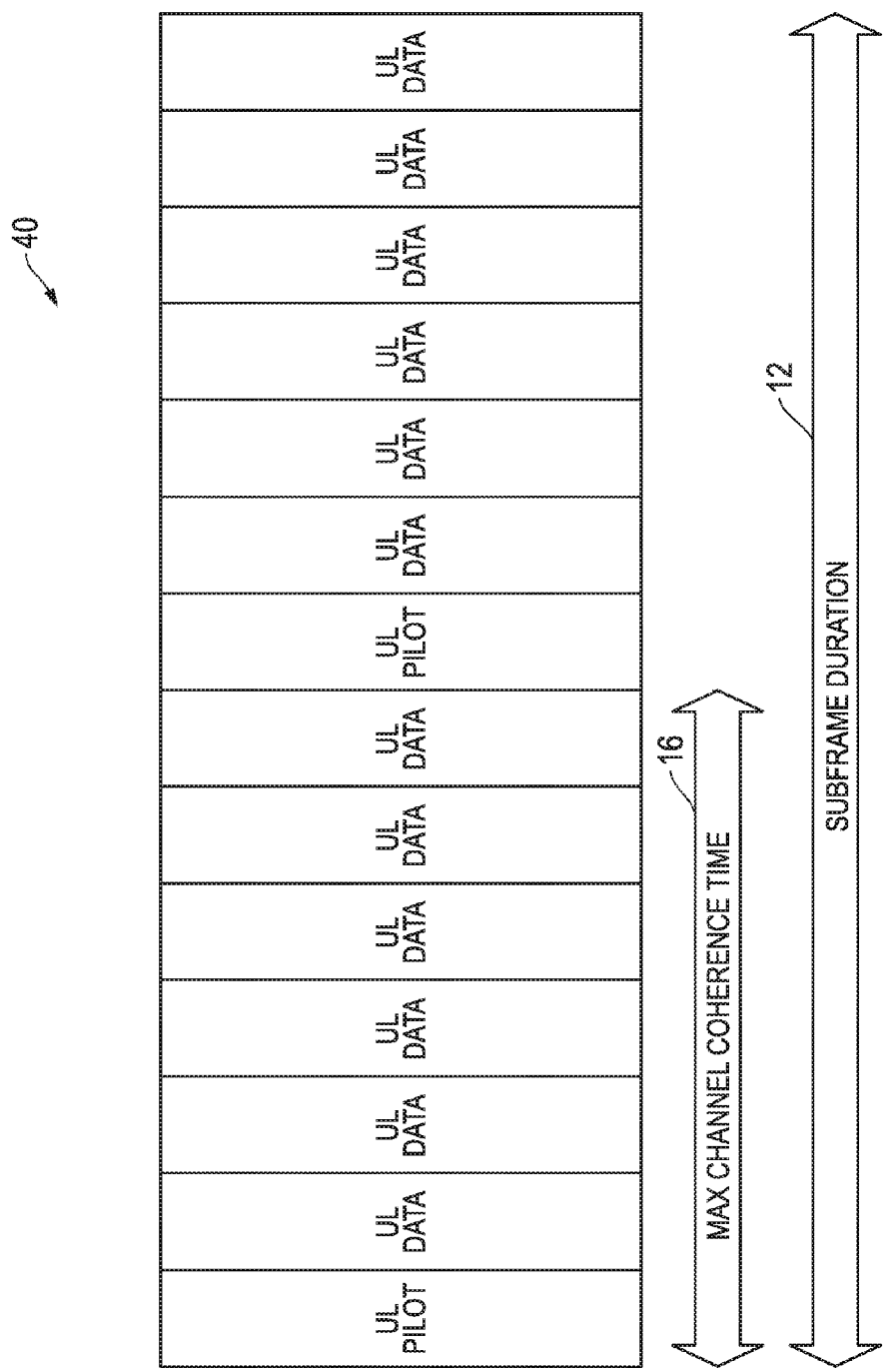
FIGS. 4-5 are diagrams of example embodiments for variations of the frame structure shown in FIG. 1.
Figure 5:
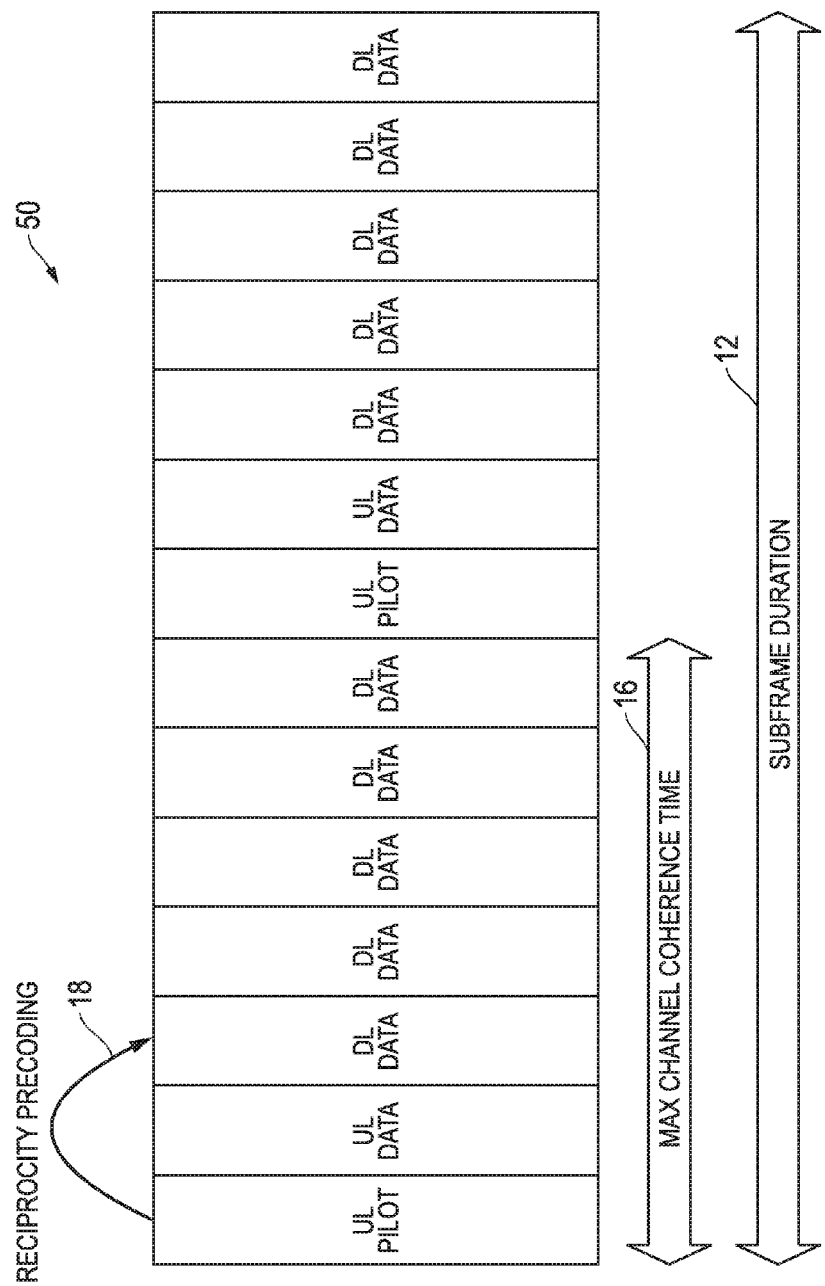

FIGS. 4-5 are diagrams of example embodiments for variations of the frame structure shown in FIG. 1. FIGS. 4-5 shows that the ratio of UL to DL traffic can change (dynamically or in a static way). For the example embodiment 40 of FIG. 4, only UL data transmissions are included within the two-slot subframe 12 along with the UL pilot without any DL data traffic. For the example embodiment 50 of FIG. 5, one UL data transmission and 5 DL data transmissions are included along with the UL pilot for each slot within the two-slot subframe 12.

It is noted that for the example embodiment of FIG. 5, the DL data traffic has been maximized under a channel reciprocity based operation for Massive MIMO deployment. It is also noted that there is at least one symbol between the UL pilot and the DL symbols. This one symbol gap is shown as a UL Data symbol in the example of FIG. 5; however, this symbol could also be a guard symbol or other desired symbol type. This one symbol gap allows for channel estimation and precoding to happen.

Figure 6:
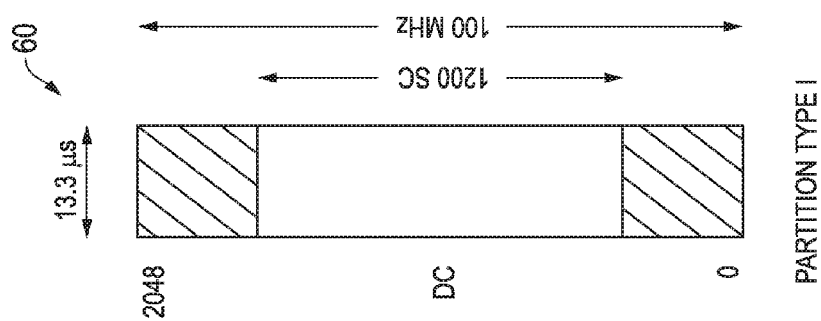
FIG. 6 is a diagram of an example embodiment for Partition Type I.

FIG. 6 is a diagram of an example embodiment 60 for Partition Type I with the numerology shown in TABLE 1 above.

Figure 7:
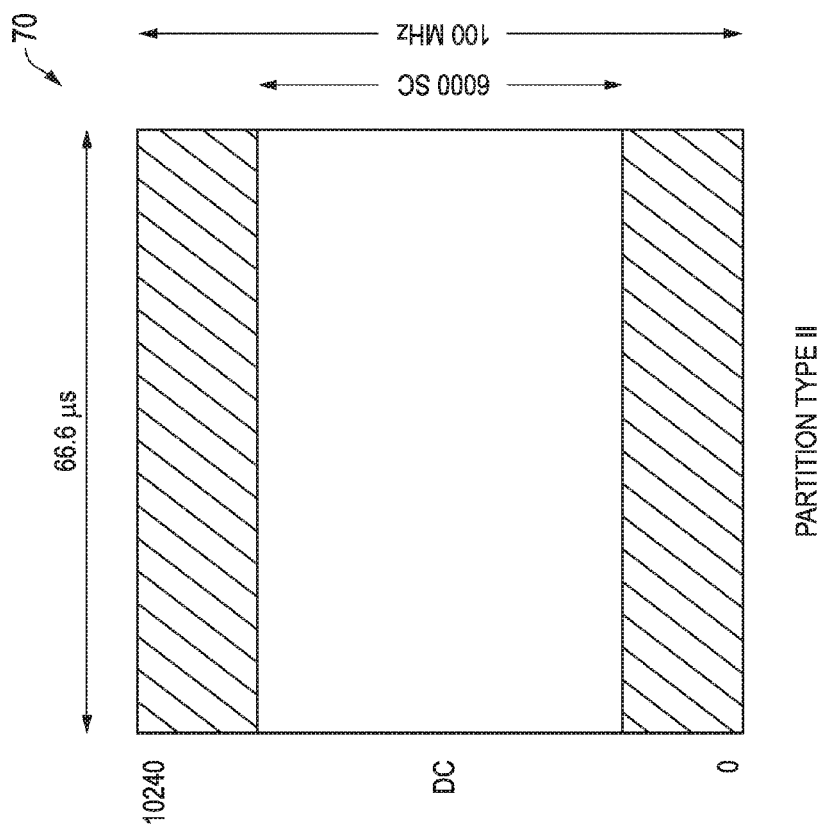
FIG. 7 is a diagram of an example embodiment for Partition Type II.

FIG. 7 is a diagram of an example embodiment 70 for Partition Type II with the numerology shown in TABLE 1 above.

Figure 8:
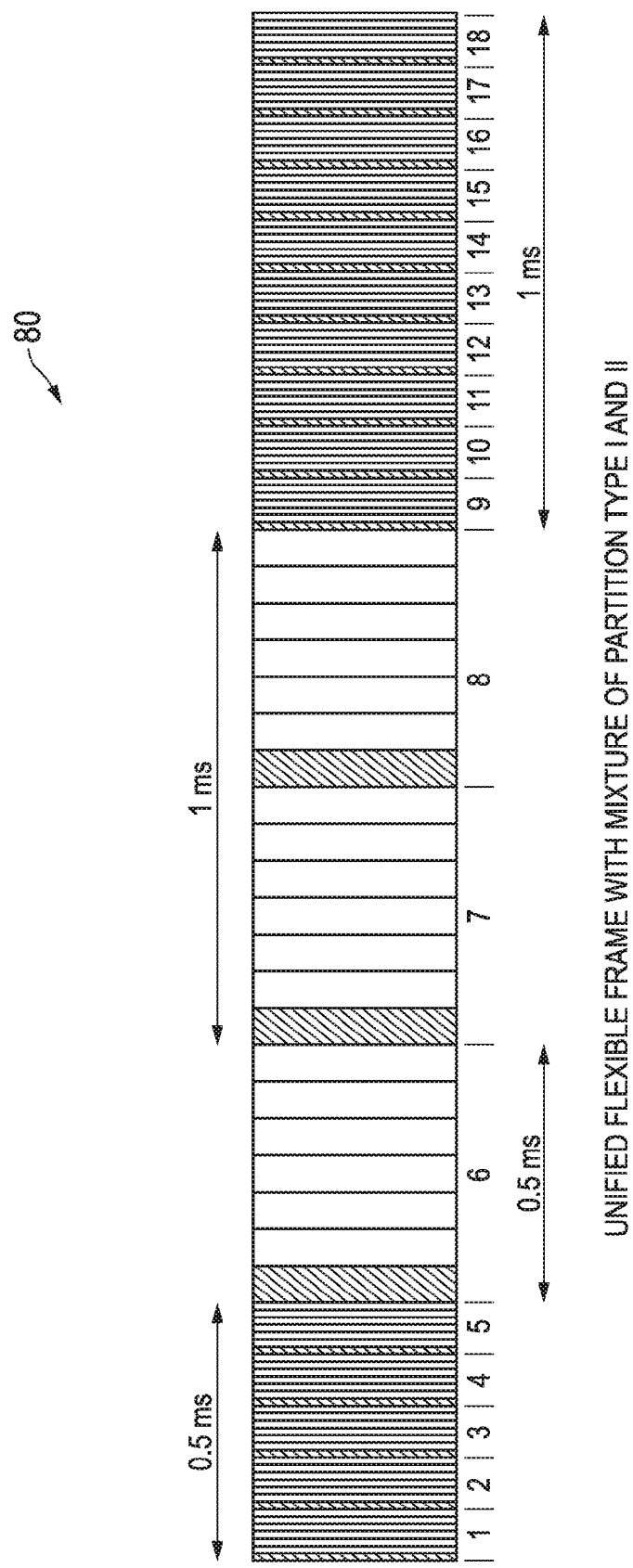
FIG. 8 is a diagram of an example embodiment for a unified flexible frame structure with mixed Partition types.

FIG. 8 is a diagram of an example embodiment 80 for a unified flexible frame structure. In this example embodiment, 5 slots of Partition I are followed by 3 slots of Partition II which is in turn followed by 10 slots of Partition I. Each partition type includes a plurality of time slots (e.g. 7 slots), and each time slot includes a plurality of symbols such as OFDM symbols.

Further Description of New Frame Structure

CP Overhead—

The new frame structure is designed with a CP (cyclic prefix) duration that addresses the Rural and Urban macro deployment scenarios, which can have an ISD of up to 5 km. TABLE 2 below compares CP overhead for the example frame types, under the assumption of legacy CP duration of ~5 µs (microseconds). Partition I with a long CP has higher CP overhead than Partition II. Partition I with a short CP has a CP duration which is reduced by the same factor as the symbol duration reduction as in TABLE 1 above, at an adverse cost to the delay spread supported.

As one observation, it is noted that Partition I increases the CP length enabling use in rural and urban macro scenarios while maintaining low latency operation required for eMBB operation.

TABLE 2

EXAMPLE PARAMETERS FOR CP OVERHEAD
FOR DYNAMIC FRAME STRUCTURE

| Frame Type | Partition Type I (Short CP) | Partition Type I (Long CP) | Partition Type II |
|---|---|---|---|
| CP Overhead | 6.6% | 20% | 6.6% |

Latency Reduction—

Layer 1 latency is determined to a large extent by HARQ (hybrid automatic repeat request) round trip delay and the TTI. Reducing the symbol duration to 13.3 µs from 66.6 µs will support shorter TTI (transmission time interval) and also reduce the HARQ RTT (round trip time) latency. Frames for Partition Type I are superior to frames for Partition Type II from a latency reduction perspective due to its 5× shorter symbol and slot duration. Other channel coding techniques not requiring HARQ may also be considered.

As another observation, it is noted that the flexible frame structure embodiments described herein allow for control of the latency based on the selected numerology for a given allocation.

Flexible Dynamic RAT—

Partition Types I & II are two example partitions. The new radio interface described herein provides for seamless coexistence of a multitude of such partitions optimized for different deployment scenarios. In particular, the framework described herein is a flexible dynamic RAT that provides this seamless coexistence. For this framework, each partition numerology is chosen such that an integer number of slots fits in the longest partition slot (0.5 ms). Further, a frame schedule of different partition types can be applied on a static, semi-static or dynamic basis. FIG. 8 shows an example frame schedule that includes a mix of Partition Types I & II.

It is also noted that the uplink/downlink (UL/DL) interval for transmit and acknowledge (ACK) can be shrunk by using a short partition type (e.g., Partition Type I above). In this case, latency is reduced along with a simultaneous reduction in per OFDM symbol throughput. This reduction may be helpful, for example, to shorten transmit to ACK turnaround.

In addition, it is noted that channel state information obtained using a sounding pilot or SRS (sounding reference signal) can be compressed in time (and frequency) to reduce link overhead by using a short partition type (e.g., Partition Type I above). By using a short partition type, there is some loss in frequency resolution. However, high resolution is not needed, for example, with respect to downlink beamforming. As such, short partition types can be used in such circumstances to reduce the SRS overhead in a radio frame.

Further, it is noted that different types of communications can be configured to use different partition types, and this configuration can be dynamically assigned. For example, control messages and SRS or sounding pilots can be assigned to one partition type, and data communications can be assigned to a different partition type. In other words, different partition types within a multi-partition frame can be assigned to different communication types as part of frame scheduling.

Still further, it is noted that different partition types can be used when there are different CP (cyclic prefix) requirements for different UEs. Some UEs may have long delay spreads whereas others may have short delay spreads. The short delay spread UEs can be scheduled into a short partition type (e.g., Partition Type I above) to reduce CP overhead of the link. The long delay spread UEs can be scheduled into a long partition type (e.g., Partition Type II above). These partition types can also be dynamically assigned as needed depending on the delay spread distribution of the UEs in a cell.

Figure 9:
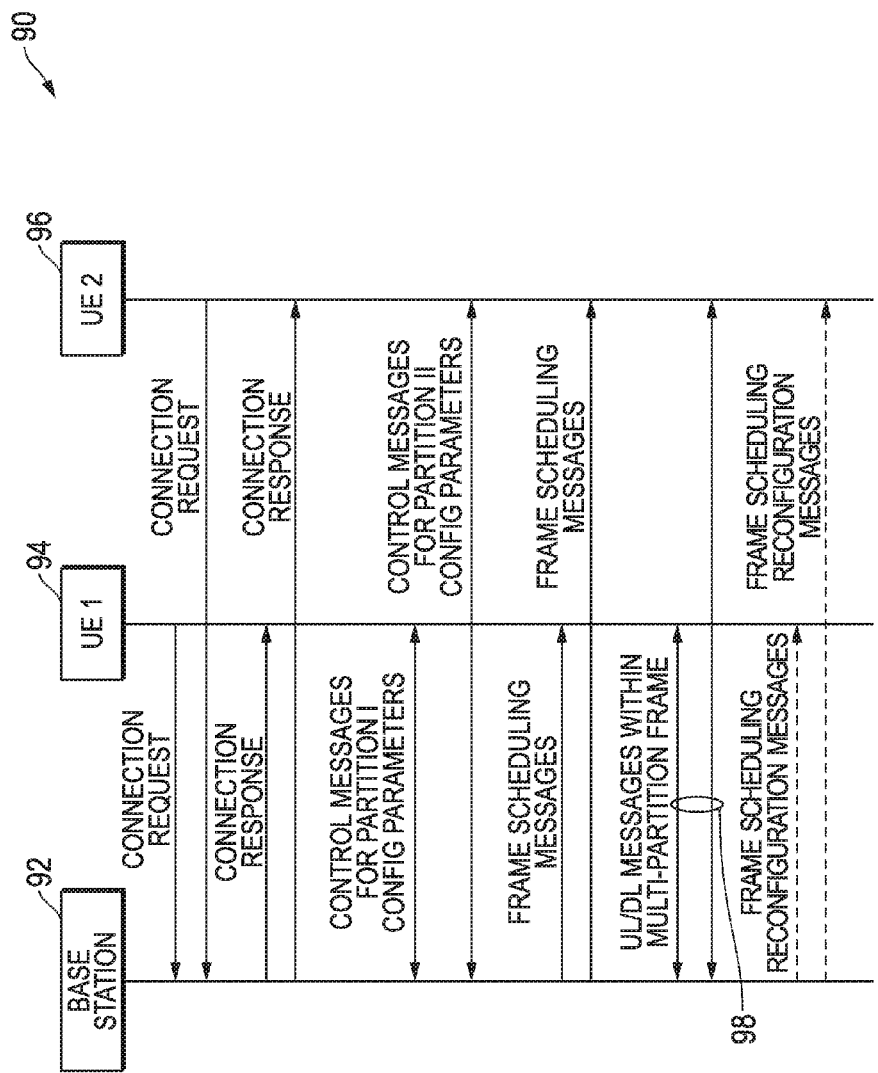
FIG. 9 is a swim lane diagram of an example embodiment for multi-partition frame configuration and scheduling between a base station and multiple UEs.

FIG. 9 is a swim lane diagram of an example embodiment 90 for multi-partition frame configuration and scheduling between a base station 92 and first UE 94 and between the base station 92 and a second UE 96. For the example embodiment 90 shown in FIG. 9, connection requests are sent from UE 94 to the base station 92 and from UE 96 to the base station 92. Connection responses are then sent from the base station 92 to the UE 94 and from the base station 92 to the UE 96. Control messages are then communicated between the base station 92 and the UE 94 that include configuration (CONFIG) parameters for a first partition type (e.g., Partition Type I described above). Control messages are communicated between the base station 92 and the UE 96 that include configuration (CONFIG) parameters for a second partition type (e.g., Partition Type II described above). Frame scheduling messages are communicated from the base station 92 to the UEs 94/96 to schedule UL/DL messages within a multi-partition frame. UL/DL messages are then communicated between the base station 92 and the UEs 94/96 within the multi-partition frame as indicated by arrows 98. In addition, the frame scheduling can be reconfigured through additional reconfiguration messages communicated from the base station 92 to the UEs 94/96 that reconfigure the frame scheduling for the multi-partition frame. It is noted that FIG. 9 provides one example embodiment and that other variations could also be implemented while still taking advantage of the dynamic and flexible frame structure embodiments and related components described herein.

Figure 10:
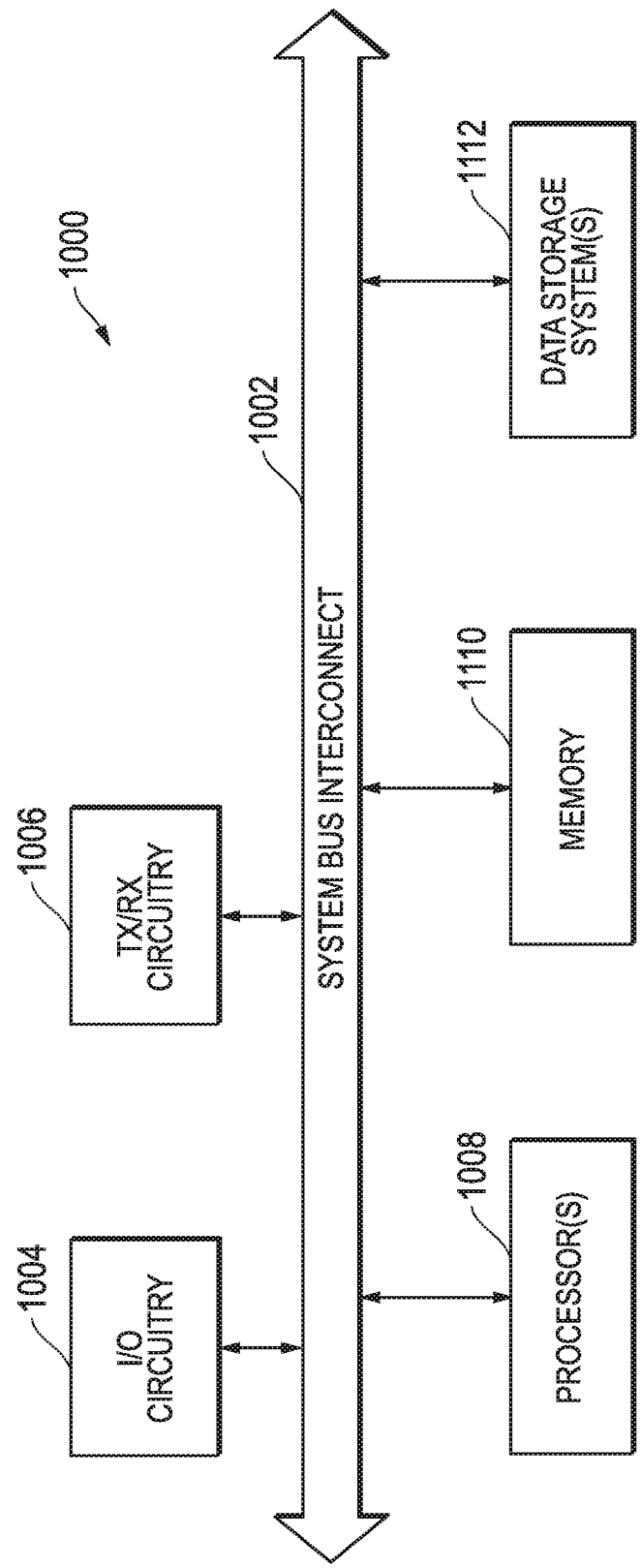
FIG. 10 is a diagram of an example embodiment for electronic components that can be used to implement a base station, user equipment (UE) and/or other processing systems for the disclosed embodiments.

FIG. 10 is a diagram of an example embodiment 1000 for electronic components that can be used to implement a base station, user equipment (UE), and/or other processing systems for the disclosed embodiments. For the example embodiment 1000 shown in FIG. 10, one or more processors 1008 communicate with other components through system bus interconnect 1002. For example, the one or more processors 1008 communicate with input/output (I/O) circuitry 1004 and transmit/receive (TX/RX) circuitry 1006 through the system bus interconnect 1002. Additional circuitry can also be included such as power supply circuitry and/or other desired circuitry. The TX/RX circuitry 1006 can be used to provide, for example, a 5G cellular MIMO radio and/or other desired radios. The I/O circuitry 1004 can be used to provide one or more interfaces for users and/or peripherals. The memory 1110 is also coupled to the system bus interconnect 1002 and can be used by the one or more processors 1008 to load and/or store instructions, data, and/or other information during operation. One or more data storage device(s) 1112 are also connected to the system bus interconnect 1002 and can store software or program instructions and/or other desired data or information for the operation of the processing system. For example, computer-readable instructions stored in the data storage devices 1112 can be loaded within the memory 1110 and then executed by the processor(s) 1008 to carry out the functions described herein.

It is noted that different and/or additional components from those depicted in FIG. 10 could also be used to implement one or more processing systems for the embodiments described herein while still taking advantage of the dynamic and flexible frame structure embodiments and related components described herein. It is further noted that the system bus interconnect 1002 can be implemented as multiple interconnection buses with our without additional intervening circuitry such as routing or switching circuitry. Further, the processor(s) 1008 can be implemented using one or more processing devices including controllers, microcontrollers, microprocessors, hardware accelerators, configurable logic devices (e.g., field programmable gate arrays), and/or other programmable integrated circuits that are programmed to carry out the function described herein. Further, the one or more processor(s) 1008 can execute instructions stored in a non-transitory tangible computer-readable medium to perform the functions described herein. In addition, data storage device(s) 1112 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 1110 can be any data storage medium configured to maintain data storage when powered. Other variations could also be implemented.

As described herein, therefore, a new flexible and dynamic frame structure is disclosed that is suitable for Massive MIMO. This frame structure is also suitable for ITU (International Telecommunication Union) IMT-2020 deployment scenarios. A number of extensions were also presented for numerology to 100 MHz channels based on this new flexible and dynamic frame structure. Other variations are described and can also be implemented.

It is noted that the functional blocks described herein can be implemented using hardware, software, or a combination of hardware and software, as desired. In addition, one or more processors or programmable integrated circuits running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or programmable integrated circuits to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other programmable integrated circuits. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the reciprocity compensation techniques described herein.

FIGS. 11-18 will now be described in more detail and provide example embodiments from U.S. Published Patent Application 2015/0326291.

As indicated above, massive MIMO (multiple input, multiple output) communication systems can be used for 5G dynamic TDD (time division duplex) air interfaces. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC). Example embodiments for massive MIMO communication systems and related signaling and frame structures are described within U.S. Published Patent Application 2015/0326291, entitled "SIGNALING AND FRAME STRUCTURE FOR MASSIVE MIMO CELLULAR TELECOMMUNICATION SYSTEMS," which is hereby incorporated by reference in its entirety.

Looking first to FIGS. 11-16, example embodiments are provided for a massive MIMO communication system described in U.S. Published Patent Application 2015/0326291.

Figure 11:
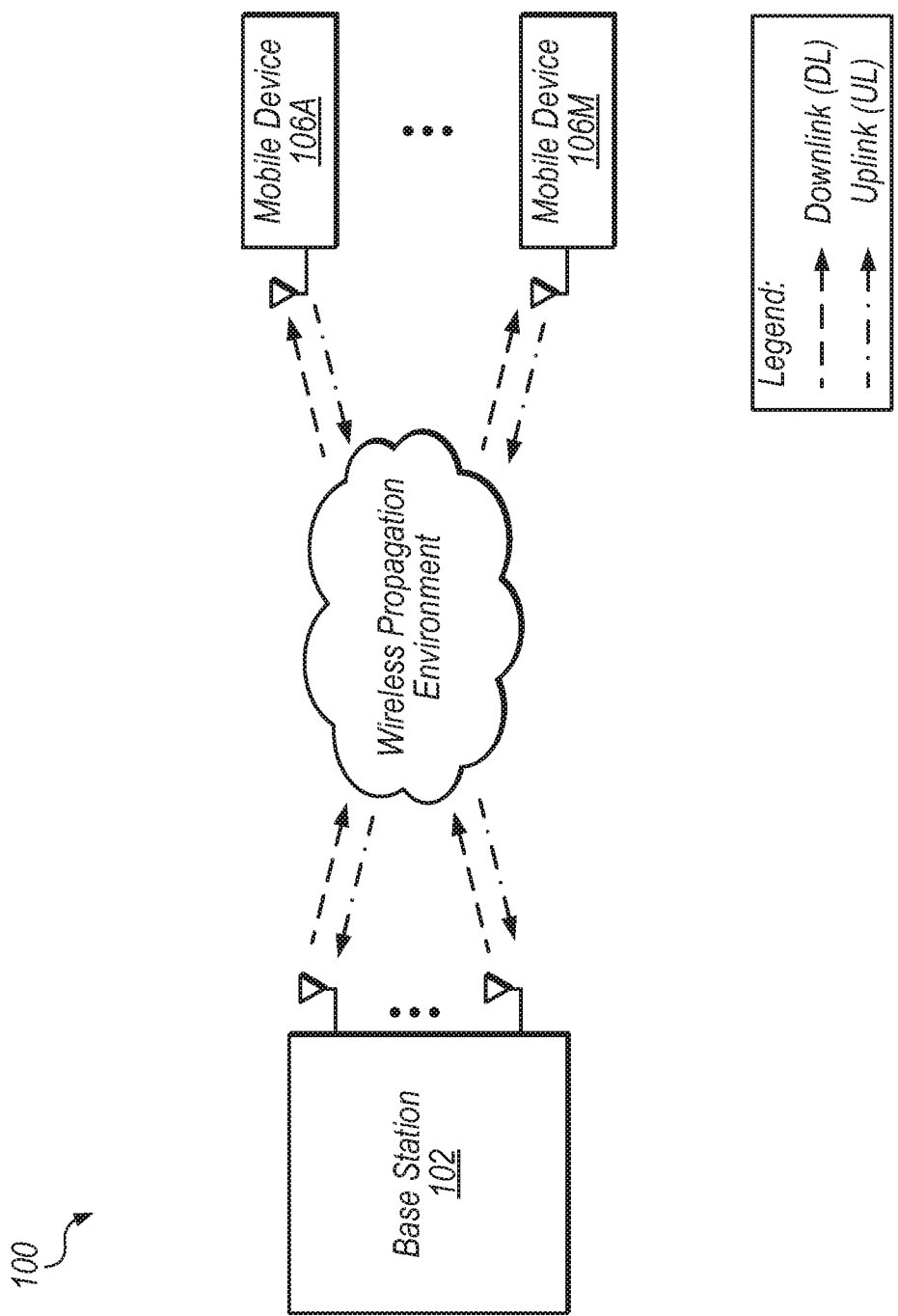
FIG. 11 is a block diagram illustrating MIMO communications in a wireless propagation environment, according to some embodiments.

FIG. 11 shows an exemplary MIMO system 100 that includes base station 102 and M mobile devices 106A-M (which may also be referred to as user equipment devices or UEs 106A-M). In the illustrated embodiment, base station 102 includes N antennas configured to transmit and receive data with mobile devices 106 using time-division duplexing (TDD). In other embodiments, other transmission techniques may be used including frequency-division duplexing (FDD), for example.

In system 100, mobile devices 106 may concurrently communicate with base station 102 via wireless propagation environment. The paths taken by different signals may vary among the mobile devices, e.g., based on their location in the environment. Therefore, using MIMO techniques to precode signals transmitted by the base station, for example, may greatly improve overall radio capacity, performance, and/or range. Thus, base station 102 may allocate multiple antennas (e.g., as many as ten or more in some massive MIMO systems) to a given mobile device 106. To configure allocation, in some embodiments, mobile devices may concurrently transmit a known pattern to the base station in a particular time or frequency slot. Base station 102 may compare the pattern across a number of antennas to determine the unique channel characteristics to each spatially diverse path for the different UEs. Subsequently, the base station may apply the inverse of channel characteristic parameters as a form of precoding, such that each mobile device 106 receives its intended messages.

Speaking generally, MIMO techniques may increase capacity, performance, and/or range of wireless communications. Although various embodiments are discussed herein in the context of cellular communications, these embodiments are not intended to limit the scope of the present disclosure. Rather, the disclosed techniques may be used in various wireless communication contexts, such as WIFI, for example.

Figure 12:
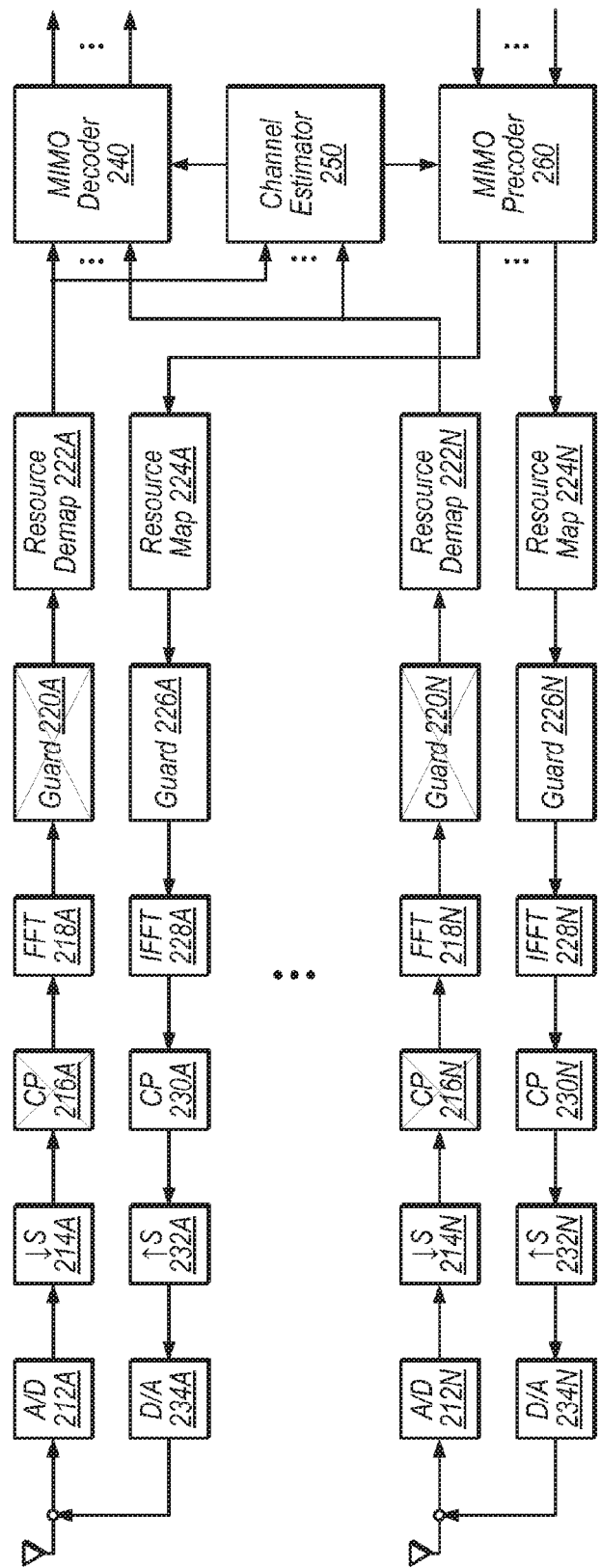
FIG. 12 is a block diagram illustrating exemplary send and receive processing chains for reciprocity-based MIMO, according to some embodiments.

FIG. 12 shows exemplary send and receive chains for reciprocity-based MIMO for two antennas, which may be included in MIMO base station 102, for example. In the illustrated embodiment, analog-to-digital (A/D) converters 212A-N demodulate and digitize received uplink signals from RF. Down-samplers 214A-N down-sample the digital samples to a desired sampling rate, e.g., that is some fraction of the A/D sampling rate. Subsequently, units 216A-N, 218A-N, 220A-N, and 222A-N perform OFDM signal processing, including removing the cyclic prefix (CP), performing a Fast Fourier Transform (FFT) after serial-to-parallel conversion, removing guard subcarriers, and de-allocating uplink data and pilots to the resource map. Base station 102 may then pass pilot and data symbols for all N receive chains to channel estimator 250.

Channel estimates generated by channel estimator 250, in the illustrated embodiment, are used by MIMO decoder 240 to decode M uplink data streams and by MIMO precoder 260 to precode M downlink data streams.

The precoded downlink data streams, in the illustrated embodiment, are then processed by units 224A-N, 226A-N, 228A-N, and 230A-N, including resource mapping, adding guard symbols, serial-to parallel conversion, performing an inverse FFT, and adding the cyclic prefix. Subsequently, units 232A-N up-convert the data from the baseband rate and digital to analog converters (D/As) 234A-N convert the result for transmission via the antennas.

Various disclosed techniques address challenges when adding a large number of receive and transmit chains to a system, as in massive MIMO. In some embodiments, software defined radios are used to implement a massive MIMO system that is configurable, modular, meets I/O requirements for distributed processing, and supports real-time processing for large numbers of antennas.

Figure 13:
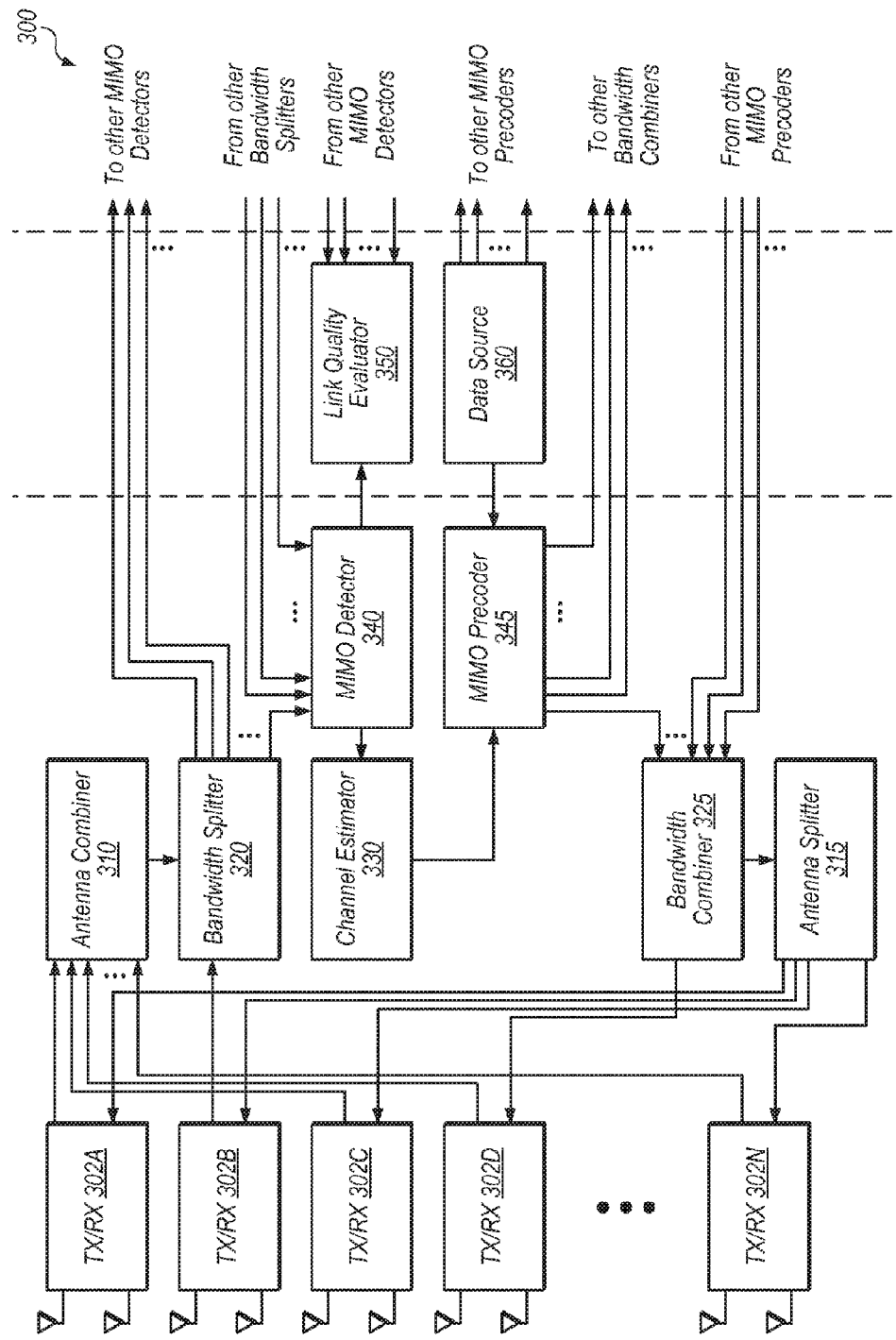
FIG. 13 is a block diagram illustrating a portion of an exemplary massive MIMO system configured to distribute processing, according to some embodiments.

FIG. 13 is a block diagram illustrating a subsystem of one embodiment of a massive MIMO system 300. System 300 may be included in base station 102, for example. In some embodiments, system 300 is configured to perform at least a portion of the processing described above with reference to FIG. 12 in a distributed manner In the illustrated embodiment, the subsystem includes front-end TX/RX units 302A-N, antenna combiner 310, antenna splitter 315, bandwidth splitter 320, bandwidth combiner 325, channel estimator 330, MIMO detector 340, and MIMO precoder 345. In the illustrated embodiment, link quality evaluator 350 and data source 360 are included in a central control unit that is shared among multiple subsystems (as indicated by the vertical dashed lines, delineating units included in the central controller, according to this embodiment).

Other subsystems of system 300 (not shown), in the illustrated embodiment, include additional MIMO detectors, MIMO precoders, bandwidth splitters, and bandwidth combiners. For example, in an embodiment in which the subsystem of FIG. 13 includes eight TX/RXs 302 and the system includes six subsystems, 96 antennas may be used. MIMO processing, in the illustrated embodiment, is distributed among various processing elements. This may allow baseband processing to be partitioned across multiple FPGAs, for example. This may facilitate scaling of massive MIMO systems far beyond what a single centralized processing unit could achieve for real-time baseband processing.

TX/RX units 302A-N, in some embodiments, are included in software defined radio modules, which may also include processing elements configured or configurable to perform the functionality of various other units shown in FIG. 13. For example, TX/RX 302A and antenna combiner 310 may be implemented by the same SDR element. An exemplary embodiment of a peripheral configured to implement an SDR is discussed in further detail below with reference to FIG. 14.

For uplink symbols, as previously discussed with reference to FIG. 12, each TX/RX 302 may be configured to digitize the received RF signals, perform analog front-end calibration and time/frequency synchronization, remove the cyclic prefix (CP), and perform FFT OFDM demodulation and guard-band removal. This may result in frequency domain pilot and unequalized data symbol vectors, which is provided to antenna combiner 310 in the illustrated embodiment. Note that, at this point, the OFDM symbols may contain the superposition of transmitted signals by all users. For downlink symbols, each TX/RX 302 may be configured to perform ODFM processing as described above with reference to FIG. 12 for signals received from antenna splitter 315.

In one embodiment, antenna combiner 310, bandwidth, splitter 320, MIMO precoder 345, bandwidth combiner 325, and antenna splitter 315 are each located on a different SDR element that also implements one of TX/RXs 302. In one embodiment, channel estimator 330 and MIMO detector 340 are located on another SDR element that also implements one of TX/RXs 302. In various embodiments, the various elements of FIG. 13 may be partitioned among various hardware elements configured to perform the disclosed functionality. The hardware elements may be programmable and/or include dedicated circuitry.

Antenna combiner 310, in the illustrated embodiment, is configured to receive the yet unequalized OFDM symbols from each TX/RX 302 and combines them into a signal sent to bandwidth splitter 320. This combines the signals from up to N antennas in the subsystem. Combining this information before further processing may allow the system to stay within throughput constraints and may reduce the number of peer-to-peer connections between SDRs, for example. In some embodiments, the number of antennas for which signals are combined by each antenna combiner 310 is dynamically configurable.

Bandwidth splitter 320, in the illustrated embodiment, is configured to split the received signals into separate bandwidth portions and send the portions to MIMO detectors in different subsystems. Thus, in the illustrated embodiment, processing is distributed across different processing elements that each process data for a different frequency band. Each bandwidth portion may include one or more subcarriers and the portions may or may not be non-overlapping. In some embodiments, the number of bandwidth portions and the size of each portion is configurable, e.g., based on the number of antennas, current number of users in communication, etc. In other embodiments, processing may be distributed among processing elements across different time slices in addition to and/or in place of splitting by frequency. In some embodiments, bandwidth splitter 320 is replaced with a time-slice splitter. Post-FTT subcarrier processing in OFDM may be inherently independent, allowing subsequent processing to be performed in parallel by different processing elements.

In the illustrated embodiment, the output of TX/RX 302B is provided directly to bandwidth splitter 320 and an output of bandwidth combiner 325 is provided directly to TX/RX 302D. In other embodiments, these outputs may be provided to antenna combiner 310 and antenna splitter 315 similarly to the other signals. In embodiments in which TX/RX 302B and bandwidth splitter 320 share the same SDR element and TX/RX 302D and bandwidth combiner 325 share the same SDR element, however, the illustrated coupling may conserve I/O resources.

MIMO detector 340, in the illustrated embodiment, is configured to use an estimated channel matrix (e.g., based on uplink pilot symbols) to cancel interference and detect frequency-domain symbols from each mobile device 106. As shown, in some embodiments MIMO detector 340 is configured to process signals in a given bandwidth from multiple subsystems of system 300. In the illustrated embodiment, MIMO detector 340 is configured to send the detected signals to channel estimator 330 and to link quality evaluator 350 (included in a central controller in some embodiments) for further processing.

Channel estimator 330, in the illustrated embodiment, is configured to perform channel estimation for its frequency portion for a number of mobile devices, e.g., to produce soft-bits (also referred to as log-likelihood ratios (LLRs)) and provide them to link quality evaluator 350 (coupling not shown). In some embodiments, multiple decoders are implemented, including a turbo decoder, for example.

For downlink symbols, data source 360, in test system embodiments, is configured to generate test data, which may be pseudo-random or may be explicitly specified for a particular test. In these embodiments, data source 360 may be located in a central control unit. In production systems, data source 360 may provide data from various networks to be transmitted to mobile devices 106.

MIMO precoder 345, in the illustrated embodiment, is configured to receive downlink data from data source 360 and precode the data based on channel estimates (e.g., estimated reciprocity calibration weights) from channel estimator 330. In some embodiments, the MIMO precoders in system 300 are configured to perform precoding on different frequency portions of the downlink data. In some embodiments (not shown), the MIMO precoders in system 300 are configured to perform precoding on different time portions of the downlink data.

Exemplary precoders, according to some embodiments, include maximum radio transmission (MRT) and zero forcing (ZF) precoders. In other embodiments, any of various appropriate precoding techniques may be implemented. Depending on the precoding technique implemented, varying amounts of processing for the precoding may be performed by at a central controller or distributed among MIMO precoders 345.

Bandwidth combiner 325, in the illustrated embodiment, is configured to combine signals at different bandwidths from multiple MIMO precoders and send the data to antenna splitter 315. This may result in a complete set of precoded data for transmission from the separately processed bandwidth portions. In other embodiments, bandwidth combiner 325 is configured to combine data corresponding to separately-processed time slices in place of or in addition to combining separately-processed frequency portions.

Antenna splitter 315, in the illustrated embodiment, is configured to split the received signal and provide the split signal to TX/RXs 302 for OFDM processing and transmission to mobile devices 106. The set of antennas to which antenna splitter 315 is configured to provide signals is dynamically configurable, in some embodiments (e.g., the number of antennas and/or the particular antennas in the set). Thus, in some embodiments, the set of processing elements configured to perform distributed processing for particular antennas and/or users is dynamically configurable.

Link quality evaluator 350, in the illustrated embodiment, is included in a central control unit and is configured to measure link quality using one or more of various metrics such as bit error rate (BER), error vector magnitude (EVM), and/or packet-error rate (PER).

In various embodiments, system 300 is highly configurable, e.g., based on user input and/or current operating conditions. In some embodiments, various disclosed configuration operations are performed automatically. In some embodiments, the number of processing elements used at a given time to perform distributed processing for a set of users or a set of antennas is configurable. In some embodiments, the number of antennas used to communicate with each UE is configurable and/or dynamically determined. In some embodiments, the processing elements configured to perform different functionality described above is configurable. For example, the antenna combiner function may be moved from one FPGA to another FPGA or performed by multiple FPGAs. In some embodiments, the routing of data between processing elements is configurable, e.g., to avoid malfunctioning antennas and/or processing elements. In various embodiments, system 300 is configured to adjust these configurable aspects dynamically based on current operating conditions. In some embodiments, system 300 includes a large number of antennas, e.g., more than 8. In some embodiments, for example, system 300 includes 16, 32, 64, 100, 128, 256, or more antennas. In some embodiments, components of system 300 are modular such that the number of antennas may be increased by adding additional components.

In some embodiments, a software library is provided with system 300 and is configured with example test scenarios for configuring system 300. In some embodiments, a graphical programming language such as LabVIEW is used to configure programmable hardware devices in system 300. Thus, various functionality described herein may be configured using a graphical programming interface.

Exemplary high-level system parameters, according to some embodiments, include a system bandwidth of 20 MHz, a carrier frequency of 3.7 GHz, a sampling rate of 30.72 MS/s, and FFT size of 2048, 1200 used subcarriers, a 0.5 ms slot time, a 1 ms subframe time, a 10 ms frame time, and 100 antennas. These parameters are exemplary only and are not intended to limit the scope of the present disclosure. In some embodiments, the parameters are user configurable and/or are dynamically configurable by the system itself.

In the illustrated embodiment, bandwidth splitter 320 is configured to separate and provide bandwidth portions of the incoming signals from multiple antennas in order to distribute processing load. In other embodiments, the incoming signals maybe split in other dimensions in addition to and/or in place of the frequency dimension. Processing for downlink signals may be similarly distributed. Thus, in various embodiments, the disclosed system is highly configurable and provides high-performance distributed processing to meet real-time performance requirements for massive MIMO systems.

Figure 14:
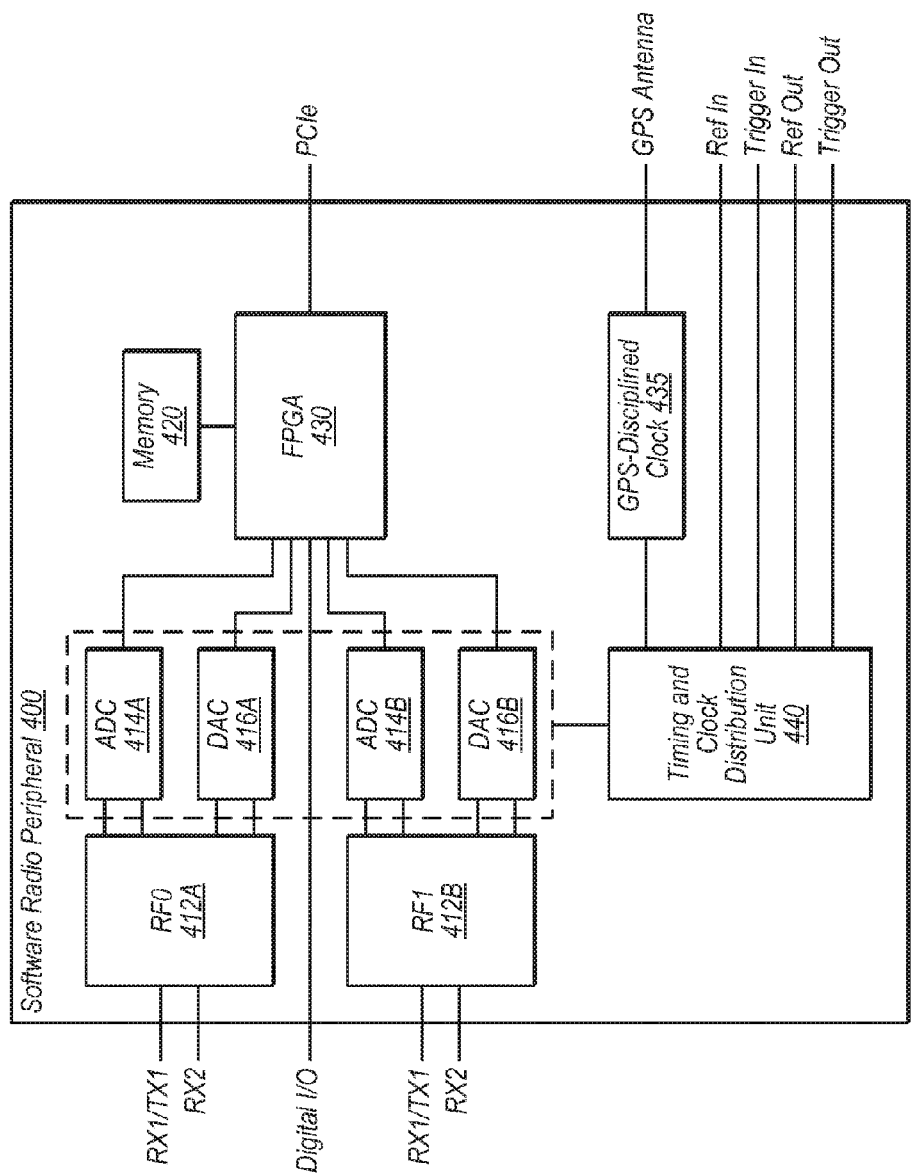
FIG. 14 is a block diagram illustrating an exemplary software radio peripheral, according to some embodiments.

FIG. 14 shows one embodiment of a software radio peripheral 400. The National Instruments USRP (Universal Software Radio Peripheral) is one exemplary embodiment of a software radio peripheral 400. In some embodiments, a software radio peripheral 400 is configured to implement one or more of TX/RXs 302 and one or more of antenna combiner 310, bandwidth splitter 320, channel estimator 330, MIMO detector 340, MIMO precoder 345, bandwidth combiner 325, and antenna splitter 315 of FIG. 13. In some embodiments, multiple software radio peripherals 400 are coupled via one or more interconnects to implement a massive MIMO base station.

Software radio peripheral 400, in the illustrated embodiment, includes radio frequency transceivers RF0 412A and RF1 412B, ADCs 414A-B, DACs 416A-B, memory 420, field-programmable gate array (FPGA) 430, timing and clock distribution unit 440, and GPS-disciplined clock 435.

RF transceivers RF0 412A and RF1 412B, in the illustrated embodiment, are configured to send and receive transmissions to one or more mobile devices 106 via one or more antennas. In one embodiment, each transceiver is configured to utilize up to 40 MHz of radio frequency bandwidth at center frequencies of 1.2-6 GHz and is configured to transmit with up to 15 decibel-milliwatts (dBm).

ADCs 414A-B and DACs 416A-B may be configured similarly to A/D 212A-N and D/A 234A-N as described above with reference to FIG. 12. In some embodiments, these elements are respectively configured to convert received analog data to digital form and received digital information to analog form for wireless transmission.

FPGA 430, in some embodiments, is a programmable hardware element configured to and/or configurable to perform various radio processing functionality. In some embodiments, FPGA 430 is configured to perform various MIMO processing described above with reference to FIG. 13. For example, FPGA 430 may be configured to perform one or more of OFDM front-end processing (e.g., as discussed with reference to units 214, 216, 218, 220, 222, 224, 226, 228, 230, and 232 of FIG. 12), antenna combining, bandwidth splitting, MIMO detection, channel estimation, MIMO precoding, bandwidth combining, antenna splitting, etc. In the illustrated embodiment, FPGA 430 is coupled to ADCs 414A-B and DACs 416A-B, a digital I/O port, and a Peripheral Component Interconnect Express (PCIe) connection. In some embodiments, software radio peripheral 400 is coupled to other software radio peripherals and/or a central control unit via PCIe (or any of various other appropriate couplings).

With reference to various operations disclosed herein, a program may be used that is capable of causing or configuring a computing system to perform various operations. This encompasses both instructions that are executable by the computing system to cause the system to perform the operation(s) and instructions that are usable to configure the computing system (e.g., by configuring FPGA 430) such that it is capable of performing the operation(s) (note that the latter type of instructions may not be executed, but may be used to configure programmable circuitry, for example, which is then configured to perform the operation(s)).

In other embodiments, FPGA 430 may be replaced or supplemented with any of various appropriate processing elements. Inclusion of a programmable hardware element in software radio peripheral 400 in some embodiments, however, may increase configurability and flexibility of the system. In test systems, for example, test engineers may modify the configuration of FPGA 430 to develop and test different MIMO software radio processing techniques. In production systems, programmable hardware elements may facilitate system reconfiguration and/or updates in various contexts.

Memory 420, in some embodiments, is configured to facilitate programming of FPGA 430 and/or storing of values (e.g., sampled and processed uplink signals) during processing operations by FPGA 430. Memory 420 may include multiple different storage elements or a single storage element and may be implemented using various different memory technologies as appropriate.

Timing and clock distribution unit 440, in the illustrated embodiment, is configured to receive information from GPS-disciplined clock 435, a reference signal input "ref in," and/or a trigger input signal. In the illustrated embodiment, unit 440 is also configured to provide a reference output signal "ref out" and a trigger output signal. In some embodiments, described in further detail below with reference to FIGS. 7-10, one or more of these signals may be used to synchronize sampling and/or other operations by multiple software radio peripherals.

GPS-disciplined clock 435, in the illustrated embodiment, is configured to receive global positioning system (GPS) signals and generate a clock signal for timing and clock distribution unit 440 that is disciplined to a GPS time. GPS is provided as one example of a reference clock, but in other embodiments, any of various appropriate reference clocks may be used, including clocks generated by satellite navigation systems other than GPS, etc. In some embodiments, the reference signal input may be configured to receive a reference clock signal and the GPS-disciplined clock 435 is omitted, disabled, or ignored.

Software radio peripheral 400 is provided as one example of a hardware module configured or configurable to implement a portion of the functionality of system 300. In other embodiments, other processing elements such as a central processing unit or a non-FPGA programmable hardware element in addition to or in place of an FPGA may be used to perform similar operations. Further, although unit 400 is referred to as a "software" radio peripheral 400 in disclosed embodiments, it may also be a hardwired radio peripheral configured to perform similar functionality. In some embodiments, software radio peripheral 400 is a plug-in module or card configured to be inserted into a chassis (such as a PCIe chassis for example) for communication with other modules. In other embodiments, processing elements configured to perform similar functionality may be integrated or coupled into a massive MIMO system using other techniques.

Software radio peripheral 400 is provided as one example of a hardware module configured to implement functionality of system 300. In other embodiments, other processing elements such as processors or other programmable hardware elements in addition to or in place of an FPGA may be used to perform similar operations. Further, although unit 400 is referred to as a "software" radio peripheral 400 in disclosed embodiments, it may also be a hardwired radio peripheral configured to perform similar functionality. In some embodiments, software radio peripheral 400 is a plug-in module or card configured to be inserted into a chassis (such as a PCIe chassis for example) for communication with other modules. In other embodiments, processing elements configured to perform similar functionality may be integrated or coupled into a massive MIMO system using other techniques.

In some embodiments, the disclosed massive MIMO system performs within practical hardware I/O limits while providing a low-latency path for time-critical processing. In some embodiments, the critical signal path is from receipt of OFDM symbols through channel estimation, MIMO precoding, and OFDM transmission. This path may be especially important for reciprocity-based MIMO. In some embodiments, this path includes RX front-end delay, CP removal, FFT, guard subcarrier removal, channel estimation, precoder calculation, guard subcarrier interleave, IFFT, CP addition, and TX front-end delay. Additional sources of latency may include overhead in data routing, packing, unpacking, and hops across the PCIe backplane. In disclosed embodiments, this latency is reduced by using efficient routing mechanisms over a high speed communication bus (such as PCIe, for example). Further, a high degree of pipelining (which may be enabled by packing data antennas-first) and the disclosed combining data from multiple antennas and then splitting it based on bandwidth before distributing the data for processing, as shown in FIG. 13, allows the number of antennas and the overall system bandwidth to be scaled upwards almost indefinitely. Pipelining, in various embodiments, may allow different sets of data (e.g., data sampled from the antennas at different times) to reside in different processing stages. For example, one FPGA may perform bandwidth splitting, then pass the data on to another FPGA for MIMO detection before splitting a subsequent set of data, in a pipelined fashion. Referring back to FIG. 13, various units may be configured to operate in a pipelined and distributed manner.

Figure 15:
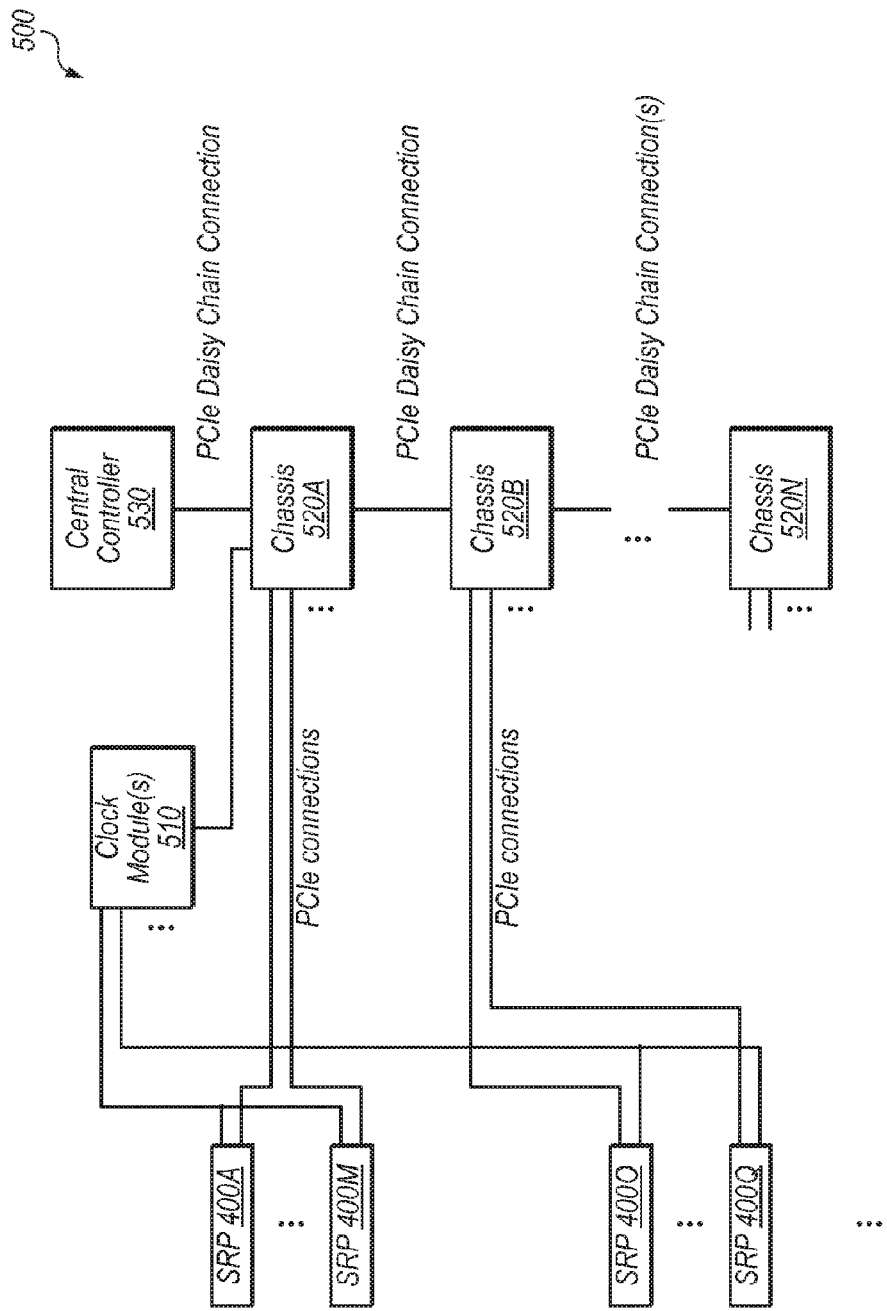
FIG. 15 is a block diagram illustrating a hardware system configured to implement a massive MIMO base station, according to some embodiments.

FIG. 15 shows one embodiment of a system 500 that includes hardware configured to implement a massive MIMO base station. In the illustrated embodiment, system 500 includes clock module(s) 510, chassis 520A-N, SRPs 400A-Q, and central controller 530.

Clock module(s) 510 are configured to distribute clock and/or trigger signals, in some embodiments, e.g., to the reference and/or trigger terminals of each SRP.

In one embodiment, each SRP 400 is included in or coupled to a chassis 520 and is configured to handle up to 800 MB/s bidirectional via a PCI eXtensions for Instrumentation Express (PXIe) backplane. In other embodiments, any of various appropriate backplane protocols may be implemented.

Chassis 520, in the illustrated embodiment, are configured to include or couple to multiple SRPs 400 via PCIe connections. In some embodiments, each chassis 520 includes one or more switches configured to route communications. In one embodiment, each chassis 520 includes two switches. Each switch may be configured to stream up to 3.2 GB/s of bidirectional traffic for each slot in the chassis, with a total of 12 GB/s shared between devices on the switch, for example. In the illustrated embodiment, the chassis 520 are coupled via a PCIe daisy chain connection. In some embodiments, daisy chain connections in star configurations may be used to build higher channel-count systems. In one embodiment, the daisy-chain cables between chassis are configured to stream up to 5.6 GB/s unidirectional or 2.8 GB/s bidirectional. In other embodiments, any of various appropriate communications protocols may be implemented. The bandwidths discussed above are exemplary only, and are not intended to limit the scope of the present disclosure. They illustrate, however, that the disclosed distributed processing results in a scalable system configured to operate within bandwidth constraints of various components.

Central controller 530, in some embodiments, is configured to implement the functionality of link quality evaluator 350 and data source 360. In some embodiments, central controller 530 provides a user interface for radio configuration, deployment of FPGA configuration code, system visualization etc. In some embodiments, central controller 530 is configured to source and sink user data, e.g., with other networks with as the Internet. In some embodiments, central controller 350 is configured to measure link quality using metrics such as bit error rate (BER), packet error rate (PER), and/or error vector magnitude (EVM), for example.

In one embodiment, five types of FPGA images are used to configure the SRPs 400 of system 500. In this embodiment, the first type is OFDM TX/RX only, used to implement one or more front-end TX/RXs 302. In some embodiments, this type may be allocated among available processing elements after allocation of the four other types. In this embodiment, the second type is OFDM TX/RX with antenna combiner and bandwidth splitter. In some embodiments, this type is spread evenly across chassis segments, e.g., with one per PXI switch segment. In one embodiments, each FPGA of this type is associated, at least initially, with sixteen antennas. In these embodiments, the third type is OFDM TX/RX with MIMO detector. In some embodiments, the MIMO detector may output channel estimates and/or LLR outputs. In these embodiments, the fourth type is OFDM TX/RX with MIMO precoder, which may output precoded data bits. In these embodiments, the fifth type is OFDM TX/RX with bandwidth combiner and antenna splitter, which may distributed similarly to the second type, as discussed above. In other embodiments, processing may be distributed among various types of processing elements (e.g., in addition to and/or in place of FPGAs) using any of various appropriate distributions.

Figure 16:
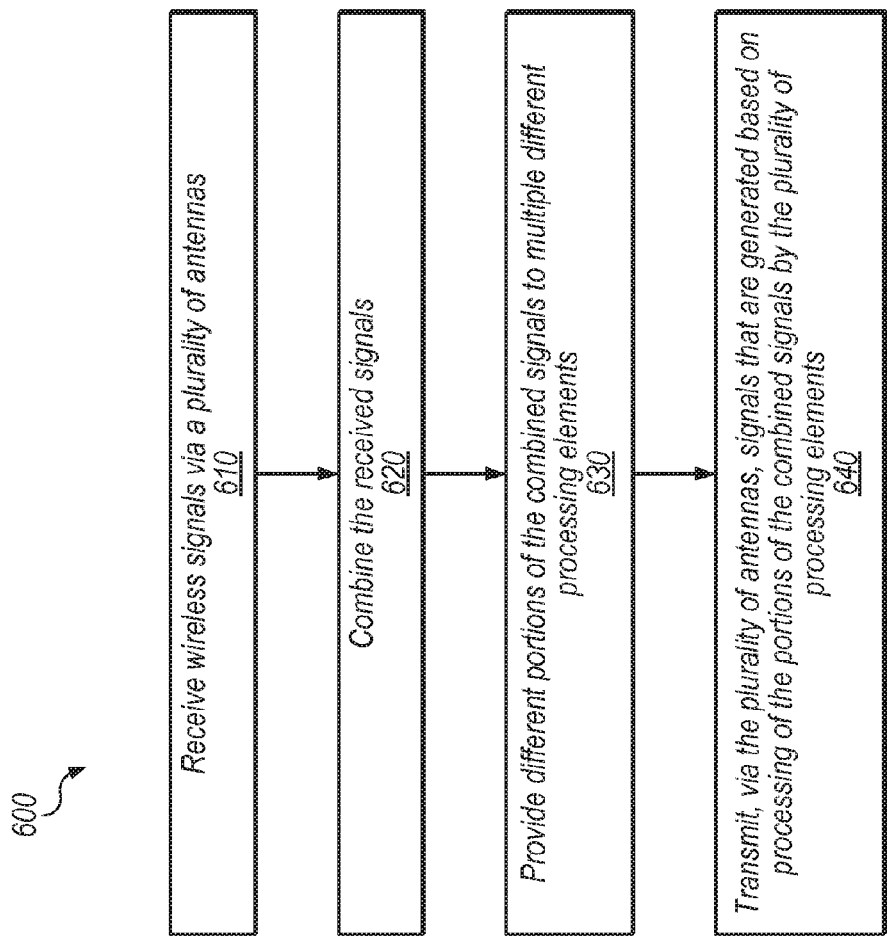
FIG. 16 is a flow diagram illustrating a method for MIMO processing according to some embodiments.

FIG. 16 shows a flow diagram illustrating one exemplary embodiment of a method 600 for massive MIMO processing. The method shown in FIG. 16 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, wireless signals are received via a plurality of antennas. For example, the illustrated subsystem of FIG. 13 may receive wireless signals via the 2N antennas coupled to TX/RXs 302A-N. In some embodiments, the signals are OFDM signals, but in other embodiments, other modulation schemes may be implemented.

At 620, the received signals are combined. In some embodiments, antenna combiner 310 is configured to combine the signals. The signals combined may be from all antennas in a given massive MIMO system or for a portion of the antennas in a massive MIMO system (e.g., for the subsystem shown in FIG. 13 or for a portion thereof). The combined signals may include information from multiple different users.

At 630, different portions of the combined signals are provided to different processing elements. In some embodiments, the different portions are mutually exclusive (e.g., the information provided to a given processing element is not provided to other processing elements). In other embodiments, there may be some overlap between the information provided to the different processing elements. In some embodiments, bandwidth splitter 320 is configured to provide frequency portions of the combined signals to different software radio peripherals 400. In some embodiments, one or more processing elements are configured to split the combined signals into different time slices and provide the time slices to different software radio peripherals 400. In some embodiments, the combined signals are split in both the time and frequency dimension to further distribute processing.

At 640, signals are transmitted via the plurality of antennas. In the illustrated embodiment, the signals are generated based on processing of the portions of the combined signals by the plurality of processing elements. For example, the processing may generate channel information used to precode the transmitted signals for massive MIMO communications. The distributed nature of the processing may allow system 300 to operate in real time and provide reciprocity-based precoding before the channel changes significantly.

In some embodiments, each processing element is configured to operate on a different frequency portion of signals received by multiple antennas. In some embodiments, each processing element is configured to operate on a different time portions of signal received by multiple antennas. In some embodiments, the number of processing elements in the subset is dynamically configurable based on current communication conditions. In some embodiments, the operating includes detecting one or more uplink pilot symbols and generated channel information based on the pilot symbols. In some embodiments, similar techniques are used for distributed processing for precoding downlink data then combining the different portions for transmission via multiple antennas.

Further, the disclosed techniques may facilitate dynamic configurability of the massive MIMO base station. For example, if elements of system 300 are malfunctioning or otherwise unavailable, system 300 is configured, in some embodiments, to alter the set of software radio peripherals assigned to a given set of antennas to route around the unavailable elements. In some embodiments, the number of processing elements assigned to a given set of antennas at a given time is also configurable. For example, the size of the bandwidth and/or time portions processed by each processing element is also configurable, in some embodiments. Further, the number of antennas used for a given user device may also be dynamically configurable. Various dynamic configuration may be performed by system 300 in response to current operations conditions, e.g., power conditions, the state of the wireless communication environment, number of user devices in communication, etc.

Figure 17:
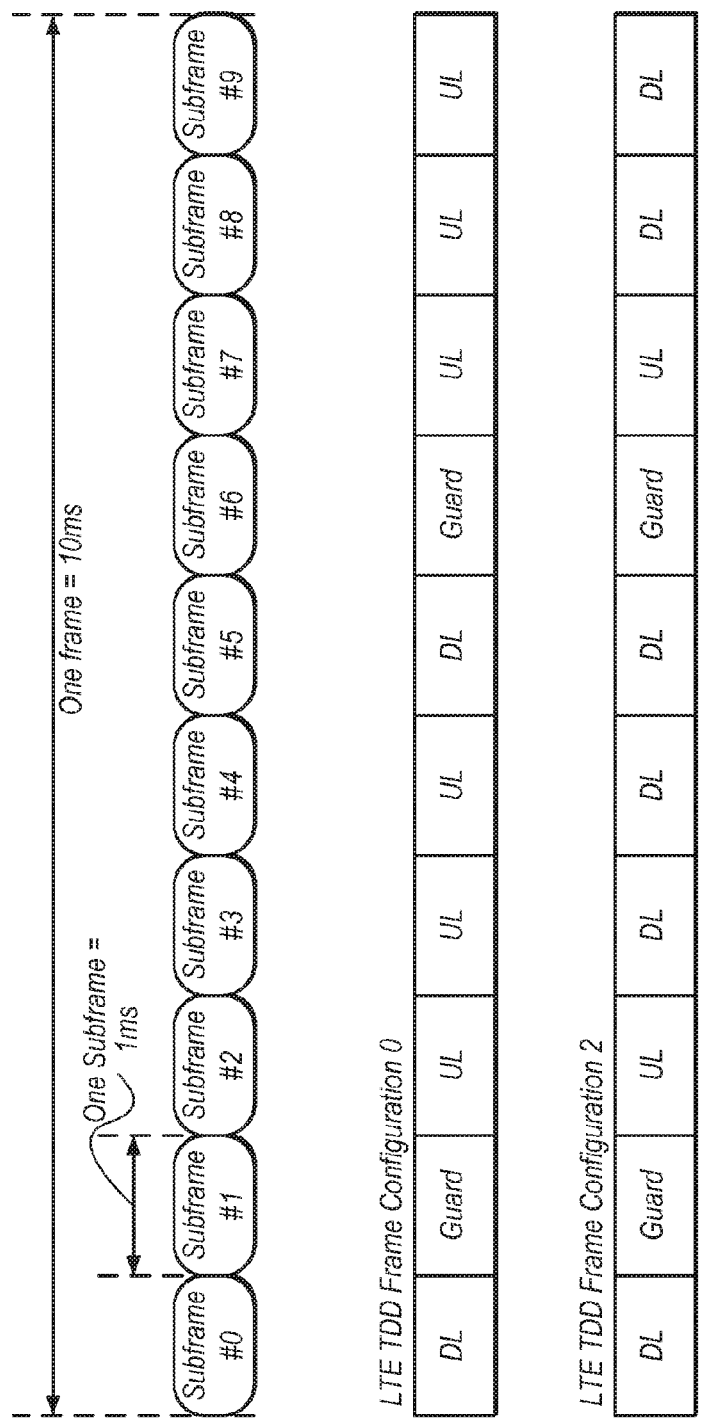
FIG. 17 is a diagram illustrating exemplary LTE TDD frame configurations, according to some embodiments.
Figure 18:
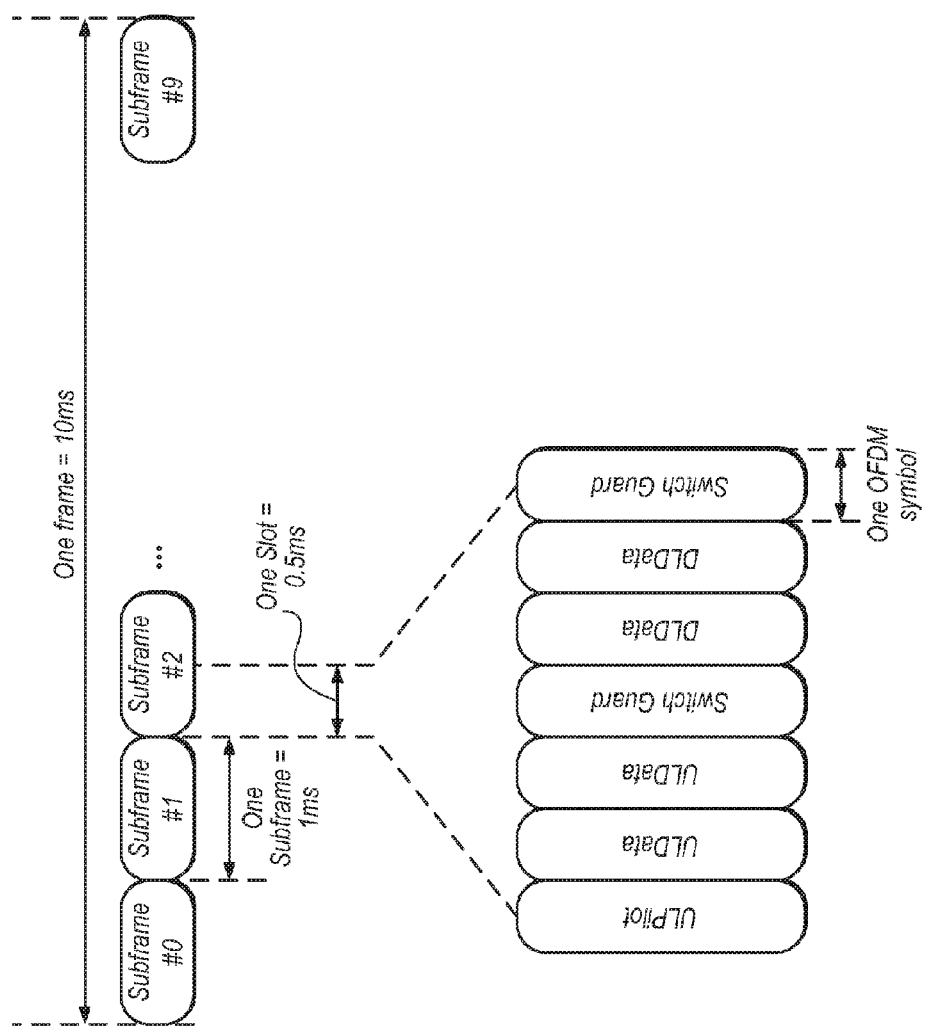
FIG. 18 is a diagram illustrating an exemplary frame structure for reciprocity-based massive MIMO communications, according to some embodiments.

Looking now to FIGS. 17-18, example embodiments of frame structures are provided for the massive MIMO communication system described in U.S. Published Patent Application 2015/0326291.

In some embodiments, the disclosed system is configured to utilize conventional signaling (e.g., 3GPP LTE signaling). In other embodiments, the LTE frame structure is modified or a different frame structure is used to improve massive MIMO processing, especially in the reciprocity-based systems.

FIG. 17 shows an exemplary LTE time division duplexing (TDD) frame. In the illustrated embodiment, the frame covers ten milliseconds (ms) in the time dimension and includes ten subframes, each covering one ms. In the illustrated embodiment, each subframe is used either for downlink (DL) data, as a guard subframe, or for uplink (UL) data. LTE TDD defines several frame configurations, two of which are shown in FIG. 17. The guard frames may include pilot time slots such as DwPTS and UpPTS.

In some embodiments, the LTE frame structure is problematic for reciprocity-based MIMO. Generally, to allow for reciprocity-based MIMO the following events must occur within the coherence time of the channel: process received samples, measure uplink channels, and precode downlink samples. In some embodiments, the turnaround time between receiving an uplink pilot symbol to transmitting a downlink symbol is specified to be less than 0.5 ms to ensure that it is less than the coherence-time, even for UEs that are moving relatively quickly. As shown in FIG. 17, this is not typically achieved using a typical LTE TDD frame, because a full 1 ms subframe is dedicated to UL or DL data.

FIG. 18 shows an exemplary data frame according to some embodiments. In the illustrated embodiment, each frame covers ten ms and includes ten subframes which each cover one ms in the time dimension. In contrast to the LTE frame of FIG. 17, however, in the illustrated embodiment each subframe (and each slot) includes both uplink and downlink data, as well as a switch guard symbol. In the illustrated embodiment, each slot (corresponding to half of a subframe) includes 7 OFDM symbols, one of which is used for an uplink pilot symbol, two of which are used for uplink data, two of which are used for downlink data, and two of which are used as guard symbols for switching between uplink and downlink In the illustrated embodiment, the uplink pilot symbol and switch guard periods each consist of a single OFDM symbol.

In some embodiments, uplink pilot symbols are sequentially interleaved in the frequency dimension for users in the system. For example, each user's pilot data may be distributed across multiple separate subcarrier chunks. In some embodiments, pre-coded pilot information is also inserted into DL OFDM symbols to allow for compensation of RF chain responses.

In some embodiments, each frame starts with a down-link broadcasting subframe to set up initial network synchronization (e.g., for mobile devices 106 to synchronize carrier and/or sampling frequency with the base station). In some embodiments, the remaining nine subframes are used for UL and DL data transmission.

In various embodiments, different frame sizes, subframe sizes, number of OFDM symbols per slot, etc. may be implemented. In various embodiments, the turnaround time between receiving an uplink pilot symbol and transmitting the last downlink data that is encoded based on the uplink pilot symbol is less than 0.5 ms. In some embodiments, the turnaround time between receiving an uplink pilot symbol and transmitting the last downlink data that is encoded based on the uplink pilot symbol is less than the coherence time of the channel, which may vary over time, e.g., based on movement of source or receiver.

As used herein, the "coherence time" of a channel quantifies the similarity of the channel response at different times and refers to a time interval over which the impulse response to the channel is considered to be not varying. Coherence time is inversely proportional to doppler spread and is often estimated using the equation 0.423 times the maximum doppler frequency (e.g., as determined based on movement of the source and/or receiver). For example, the maximum doppler frequency of a transmitter moving directly towards a receiver is the frequency of the carrier wave times the velocity of movement divided by the speed of light.

Thus, in some embodiments, frame structures with short turnaround between uplink pilot receipt and downlink data transmission allow reciprocity to be used reliably even for fast-moving mobile devices 106. As discussed above, the distributed processing techniques disclosed herein may provide a short critical path for signals and processing needed to meet such a short turnaround time.

Further, the disclosed time dimension duplexing (TDD) techniques may be advantageous relative to frequency division duplexing (FDD) techniques because FDD systems may run out of unique pilot tones for a receiver to effectively resolve channel conditions, given the large number of antennas.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An apparatus for wireless communications, comprising:
   one or more antennas;
   one or more radios coupled to the one or more antennas; and
   one or more processors coupled to the one or more radios and programmed to:
      receive communication frames including OFDM (orthogonal frequency division multiplex) symbols from a plurality of wireless devices through the one or more radios and the one or more antennas; and
      transmit communication frames including OFDM symbols to the plurality of wireless devices through the one or more radios and the one or more antennas;
   wherein the communication frames comprise multi-partition frames having a mix of different partition types;
   wherein the different partition types comprise configuration parameters including sampling rate and subcarrier spacing;
   wherein the different partition types have different subcarrier spacings and a common sampling rate;
   wherein frame scheduling applies the different partition types to the multi-partition frames on a dynamic basis;
   wherein the one or more processors are further configured to communicate control messages for configuration with the plurality of wireless devices through the one or more radios and the one or more antennas, the control messages comprising the configuration parameters of the different partition types; and
   wherein the one or more processors are further configured to communicate reconfiguration messages with the plurality of wireless devices through the one or more radios and the one or more antennas to reconfigure the frame scheduling for the multi-partition frames.

2. The apparatus of claim 1,
   wherein the configuration parameters further include OFDM symbol duration and number of OFDM symbols per time slot; and
   wherein the different partition types additionally have different one or more of the OFDM symbol duration and number of OFDM symbols per time slot.

3. The apparatus of claim 1, wherein the reconfiguration messages are communicated through a control channel.

4. The apparatus of claim 1,
   wherein the configuration parameters further include cyclic prefix length; and
   wherein the different partition types additionally have different cyclic prefix length.

5. The apparatus of claim 1,
   wherein the configuration parameters further include number of subcarriers and number of occupied subcarriers; and
   wherein the different partition types additionally have different one or more of the number of subcarriers and number of occupied subcarriers.

6. The apparatus of claim 1, wherein each partition type comprises a plurality of time slots, and wherein each time slot includes a plurality of OFDM symbols.

7. The apparatus of claim 6, wherein each OFDM symbol has a symbol type, the symbol type comprising at least one of an uplink pilot, a downlink pilot, uplink data, downlink data, sync, or guard.

8. The apparatus of claim 6, wherein the time slots for each partition type have a predetermined time length, and wherein the predetermined time lengths are different for different partition types.

9. The apparatus of claim 8, wherein the partition type having a shortest predetermined time length for its time slots represents a shortest partition type, wherein the partition type having a longest predetermined time length for its time slots represents a longest partition type, and wherein an integer number of time slots for the shortest partition type fits within one time slot for the longest partition type.

10. The apparatus of claim 9, wherein the shortest partition type has time slots with a predetermined time length of 0.1 milliseconds and the longest partition type has time slots with a predetermined time length of 0.5 milliseconds.

11. The apparatus of claim 9, wherein a longest time slot for the different partition types is 0.5 milliseconds.

12. The apparatus of claim 1, wherein the different partition types comprise two or more partition types including a first partition type and a second partition type, the first partition type being shorter in time than the second partition type, and wherein different types of communications use different partition types.

13. The apparatus of claim 12, wherein transmit and acknowledge messages communicated with the plurality of wireless devices are configured to use the first partition type.

14. The apparatus of claim 12, wherein sounding pilot communications with the plurality of wireless devices are configured to use the first partition type and wherein data communications with the plurality of wireless devices are configured to use the second partition type.

15. The apparatus of claim 12, wherein the plurality of wireless devices comprise one or more first wireless devices having a first cyclic prefix (CP) length and one or more second wireless devices having a second cyclic prefix (CP) length, the first CP length being shorter than the second CP length, and wherein communications with the one or more first wireless devices are configured to use the first partition type and wherein communications with the one or more second wireless devices are configured to use the second partition type.

16. A method for wireless communications, comprising:
   receiving communication frames including OFDM (orthogonal frequency division multiplex) symbols from a plurality of wireless devices through one or more radios coupled to one or more antennas; and
   transmitting communication frames including OFDM symbols to the plurality of wireless devices through the one or more radios and the one or more antennas;
   wherein the communication frames comprise multi-partition frames having a mix of different partition types;

wherein the different partition types comprise configuration parameters including sampling rate and subcarrier spacing;

wherein the different partition types have different subcarrier spacings and a common sampling rate;

wherein frame scheduling applies the different partition types to the multi-partition frames on a dynamic basis;

communicating control messages for configuration with the plurality of wireless devices through the one or more radios and the one or more antennas, the control messages comprising the configuration parameters of the different partition types; and communicating reconfiguration messages with the plurality of wireless devices through the one or more radios and the one or more antennas to reconfigure the frame scheduling for the multi-partition frames.

17. The method of claim 16,
wherein the configuration parameters further include OFDM symbol duration and number of OFDM symbols per time slot; and
wherein the different partition types additionally have different one or more of the OFDM symbol duration and number of OFDM symbols per time slot.

18. The method of claim 16, further comprising communicating the reconfiguration messages through a control channel.

19. The method of claim 16,
wherein the configuration parameters further include cyclic prefix length; and
wherein the different partition types additionally have different cyclic prefix length.

20. The method of claim 16,
wherein the configuration parameters further include number of subcarriers and number of occupied subcarriers; and
wherein the different partition types additionally have different one or more of the number of subcarriers and number of occupied subcarriers.

21. The method of claim 16, wherein each partition type comprises a plurality of time slots, and wherein each time slot includes a plurality of OFDM symbols.

22. The method of claim 21, wherein each OFDM symbol has a symbol type, the symbol type comprising at least one of an uplink pilot, a downlink pilot, uplink data, downlink data, sync, or guard.

23. The method of claim 21, wherein the time slots for each partition type have a predetermined time length, and wherein the predetermined time lengths are different for different partition types.

24. The method of claim 23, wherein the partition type having a shortest predetermined time length for its time slots represents a shortest partition type, wherein the partition type having a longest predetermined time length for its time slots represents a longest partition type, and wherein an integer number of time slots for the shortest partition type fits within one time slot for the longest partition type.

25. The method of claim 24, wherein the shortest partition type has time slots with a predetermined time length of 0.1 milliseconds and the longest partition type has time slots with a predetermined time length of 0.5 milliseconds.

26. The method of claim 24, wherein a longest time slot for the different partition types is 0.5 milliseconds.

27. The method of claim 16, wherein the different partition types comprise two or more partition types including a first partition type and a second partition type, the first partition type being shorter in time than the second partition type, and wherein different types of communications use different partition types.

28. The method of claim 27, further comprising communicating transmit and acknowledge messages using the first partition type.

29. The method of claim 27, further comprising communicating sounding pilots using the first partition type and communicating data using the second partition type.

30. The method of claim 27, wherein the plurality of wireless devices comprise one or more first wireless devices having a first cyclic prefix (CP) length and one or more second wireless devices having a second cyclic prefix (CP) length, the first CP length being shorter than the second CP length, and further comprising using the first partition type to communicate with the one or more first wireless devices and using the second partition type to communicate with the one or more second wireless devices.

* * * * *